(12) United States Patent
Chen

(10) Patent No.: US 11,470,676 B2
(45) Date of Patent: Oct. 11, 2022

(54) METHOD AND APPARATUS FOR CONTROLLING UE STATE TRANSITION IN A WIRELESS COMMUNICATION SYSTEM

(71) Applicant: ASUSTek Computer Inc., Taipei (TW)

(72) Inventor: I-Jen Chen, Taipei (TW)

(73) Assignee: ASUSTek Computer Inc., Taipei (TW)

( * ) Notice: Subject to any disclaimer, the term of this patent is extended or adjusted under 35 U.S.C. 154(b) by 0 days.

(21) Appl. No.: 17/566,534

(22) Filed: Dec. 30, 2021

(65) Prior Publication Data

US 2022/0232658 A1    Jul. 21, 2022

Related U.S. Application Data

(60) Provisional application No. 63/143,737, filed on Jan. 29, 2021, provisional application No. 63/138,075, filed on Jan. 15, 2021.

(51) Int. Cl.
*H04W 76/20* (2018.01)
*H04W 4/06* (2009.01)
*H04L 5/00* (2006.01)
*H04W 80/02* (2009.01)

(52) U.S. Cl.
CPC ........... *H04W 76/20* (2018.02); *H04L 5/0096* (2013.01); *H04W 4/06* (2013.01); *H04W 80/02* (2013.01)

(58) Field of Classification Search
CPC ....... H04W 76/20; H04W 4/06; H04W 80/02; H04L 5/0096
See application file for complete search history.

(56) References Cited

U.S. PATENT DOCUMENTS

| 10,979,977 | B2 * | 4/2021 | Young | H04W 52/0216 |
| 2018/0359801 | A1 * | 12/2018 | Kim | H04L 69/22 |
| 2019/0182870 | A1 | 6/2019 | Shih et al. | |
| 2019/0289504 | A1 | 9/2019 | Kim | |
| 2020/0059991 | A1 | 2/2020 | Wu | |
| 2020/0137822 | A1 * | 4/2020 | Lee | H04W 72/1268 |
| 2020/0205220 | A1 * | 6/2020 | Lee | H04W 76/19 |

(Continued)

FOREIGN PATENT DOCUMENTS

| EP | 3506713 A1 | 7/2019 |
| WO | 2022001495 A1 | 1/2022 |

OTHER PUBLICATIONS

R2-1916284, Report for NR-U, Power Savings, NTN and 2-step RACH, 3GPP TSG-RAN WG2 Meeting #108 (Nov. 20, 2019) 36 pages.

(Continued)

*Primary Examiner* — Will W Lin
(74) *Attorney, Agent, or Firm* — Skaar Ulbrich Macari, P.A.

(57) ABSTRACT

Methods and apparatuses are provided to avoid unintended UE state transition, and the risk of packet loss due to unintended UE state transition is reduced. The methods and apparatuses are also provided to avoid unintended BWP switching, and the risk of packet loss due to unintended BWP switching is reduced. A device (e.g., UE) is configured by a network node through a signaling with a functionality, wherein the functionality is associated with a timer. The device receives a package, wherein the package contains one or more payload, and the payload is mapped to a logical channel, wherein the logical channel is used for multicast and/or broadcast service, and the device starts or restarts the timer.

14 Claims, 12 Drawing Sheets

(56) References Cited

U.S. PATENT DOCUMENTS

2020/0351744 A1* 11/2020 Latheef ................ H04W 36/36
2021/0084534 A1*  3/2021 Kim .................... H04L 69/04
2021/0409984 A1* 12/2021 Agiwal ................ H04W 24/08
2022/0022282 A1*  1/2022 Lee ..................... H04W 24/10
2022/0039016 A1*  2/2022 Terry .................. H04W 74/0808

OTHER PUBLICATIONS

Extended European Search Report to the corresponding European Patent Application rendered by the European Patent Office dated Jun. 7, 2022, 10 pages.

* cited by examiner

US 11,470,676 B2

METHOD AND APPARATUS FOR CONTROLLING UE STATE TRANSITION IN A WIRELESS COMMUNICATION SYSTEM

CROSS-REFERENCE TO RELATED APPLICATIONS

The present application claims priority to and the benefit of U.S. Provisional Patent Application Ser. No. 63/138,075, filed Jan. 15, 2021, and U.S. Provisional Patent Application Ser. No. 63/143,737, filed Jan. 29, 2021; with the entire disclosure of each referenced application fully incorporated herein by reference.

FIELD

This disclosure generally relates to wireless communication networks and, more particularly, to a method and apparatus in a wireless communication system to avoid unintended User Equipment (UE) state transition and/or unintended Bandwidth Part (BWP) switching.

BACKGROUND

With the rapid rise in demand for communication of large amounts of data to and from mobile communication devices, traditional mobile voice communication networks are evolving into networks that communicate with Internet Protocol (IP) data packets. Such IP data packet communication can provide users of mobile communication devices with voice over IP, multimedia, multicast and on-demand communication services.

An exemplary network structure is an Evolved Universal Terrestrial Radio Access Network (E-UTRAN). The E-UTRAN system can provide high data throughput in order to realize the above-noted voice over IP and multimedia services. A new radio technology for the next generation (e.g., 5G) is currently being discussed by the 3GPP standards organization. Accordingly, changes to the current body of 3GPP standard are currently being submitted and considered to evolve and finalize the 3GPP standard.

SUMMARY

Methods and apparatuses are provided for avoiding unintended UE state transition, resulting in the reduction of the risk of packet loss due to unintended UE state transition. The methods and apparatuses are further provided for avoiding unintended BWP switching, resulting in the reduction of the risk of packet loss due to unintended BWP switching.

In various embodiments, a device (e.g., UE) is configured by a network node through a signaling with a functionality, wherein the functionality is associated with a timer. The device receives a package, wherein the package contains one or more payload, and the payload is mapped to a logical channel, wherein the logical channel is used for multicast and/or broadcast service, and the device starts or restarts the timer.

In various embodiments, a device (e.g., UE) is configured by a network node through a first signaling with a functionality, wherein the functionality is associated with a timer. The device is configured by the network node through a second signaling to initiate multicast and/or broadcast service, and the device applies a value "infinity" to the timer.

In various embodiments, a device (e.g., UE) is configured by a network node through a first signaling with a functionality, wherein the functionality is associated with a timer. The device is configured by the network node through a second signaling to initiate multicast and/or broadcast service, and the device removes the configuration of the functionality according to the second signaling.

In various embodiments, a device (e.g., UE) is configured with at least an activated serving cell, wherein the activated serving cell is configured with one or multiple BWPs. The device monitors Physical Downlink Control Channel (PDCCH) on an active BWP, wherein the active BWP is one of the configured BWP, and the active BWP includes an active DL BWP, wherein the active DL BWP is associated with a timer. The device receives an information from PDCCH, wherein the reception from PDCCH is addressed to a group-common RNTI (GC-RNTI), and the information indicates downlink assignment or uplink grant on the active BWP. The device starts or restarts the timer associated with the active DL BWP.

In various embodiments, the value "infinity" can be applied to the value of the bwp-InactivityTimer. Preferably, the value "infinity" is applied to the value of the bwp-InactivityTimer associated with the active DL BWP during the process steps of the UE initiating the Multicast and Broadcast Services (MBS). Preferably, the original value of the bwp-InactivityTimer associated with the active DL BWP is recovered during the process steps of the UE closing the MBS service.

In various embodiments, the configuration of the bwp-InactivityTimer is removed when the UE joins the MBS service. Preferably, the status of the bwp-InactivityTimer associated with the active DL BWP of the serving cell is changed to be "not configured" during the process steps of the UE initiating the MBS service.

DETAILED DESCRIPTION

The invention described herein can be applied to or implemented in exemplary wireless communication systems and devices described below. In addition, the invention is described mainly in the context of the 3GPP architecture reference model. However, it is understood that with the disclosed information, one skilled in the art could easily adapt for use and implement aspects of the invention in a 3GPP2 network architecture as well as in other network architectures.

The exemplary wireless communication systems and devices described below employ a wireless communication system, supporting a broadcast service. Wireless communication systems are widely deployed to provide various types of communication such as voice, data, and so on. These systems may be based on code division multiple access (CDMA), time division multiple access (TDMA), orthogonal frequency division multiple access (OFDMA), 3GPP LTE (Long Term Evolution) wireless access, 3GPP LTE-A (Long Term Evolution Advanced) wireless access, 3GPP2 UMB (Ultra Mobile Broadband), WiMax, 3GPP NR (New Radio), or some other modulation techniques.

In particular, the exemplary wireless communication systems devices described below may be designed to support one or more standards such as the standard offered by a consortium named "3rd Generation Partnership Project" referred to herein as 3GPP, including: TS 38.300 V16.4.0, "NR; NR and NG-RAN Overall Description; Stage 2"; TS 38.321 V16.3.0, "NR; Medium Access Control (MAC) protocol specification"; TS 38.331 V16.3.1, "NR; Radio Resource Control (RRC) Protocol specification"; RP-201038, (Revised Work Item on NR Multicast and Broadcast Services); R2-2008701, (Report of 3GPP TSG RAN2 #111-e meeting); Draft RAN2 112-e Meeting Report v2; Final Minutes report RAN1 #102-e v100; Draft Minutes report RAN1 #103-e v020; and R2-2102253, 38.300 Running CR for MBS in NR, CMCC. The standards and documents listed above are hereby expressly incorporated by reference in their entirety.

Figure 1:
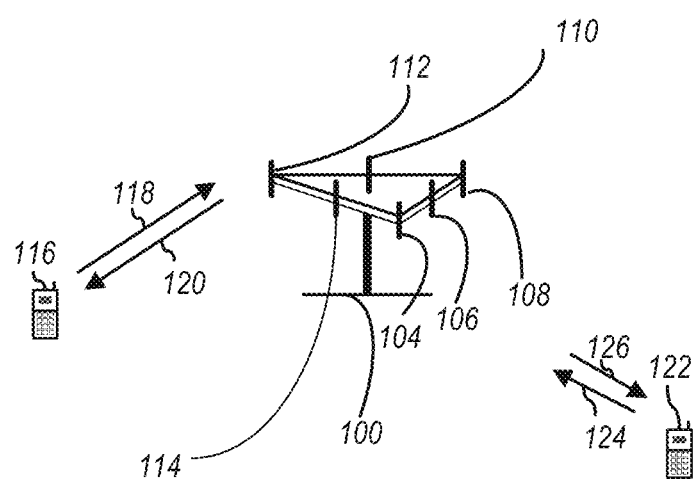
FIG. 1 shows a diagram of a wireless communication system, in accordance with embodiments of the present invention.

FIG. 1 shows a multiple access wireless communication system according to one embodiment of the invention. An access network 100 (AN) includes multiple antenna groups, one including 104 and 106, another including 108 and 110, and an additional including 112 and 114. In FIG. 1, only two antennas are shown for each antenna group, however, more or fewer antennas may be utilized for each antenna group. Access terminal (AT) 116 is in communication with antennas 112 and 114, where antennas 112 and 114 transmit information to access terminal 116 over forward link 120 and receive information from AT 116 over reverse link 118. AT 122 is in communication with antennas 106 and 108, where antennas 106 and 108 transmit information to AT 122 over forward link 126 and receive information from AT 122 over reverse link 124. In a FDD system, communication links 118, 120, 124 and 126 may use different frequency for communication. For example, forward link 120 may use a different frequency than that used by reverse link 118.

Each group of antennas and/or the area in which they are designed to communicate is often referred to as a sector of the access network. In the embodiment, antenna groups each are designed to communicate to access terminals in a sector of the areas covered by access network 100.

In communication over forward links 120 and 126, the transmitting antennas of access network 100 may utilize beamforming in order to improve the signal-to-noise ratio of forward links for the different access terminals 116 and 122. Also, an access network using beamforming to transmit to access terminals scattered randomly through its coverage normally causes less interference to access terminals in neighboring cells than an access network transmitting through a single antenna to all its access terminals.

The AN may be a fixed station or base station used for communicating with the terminals and may also be referred to as an access point, a Node B, a base station, an enhanced base station, an eNodeB, or some other terminology. The AT may also be called User Equipment (UE), a wireless communication device, terminal, access terminal or some other terminology.

Figure 2:
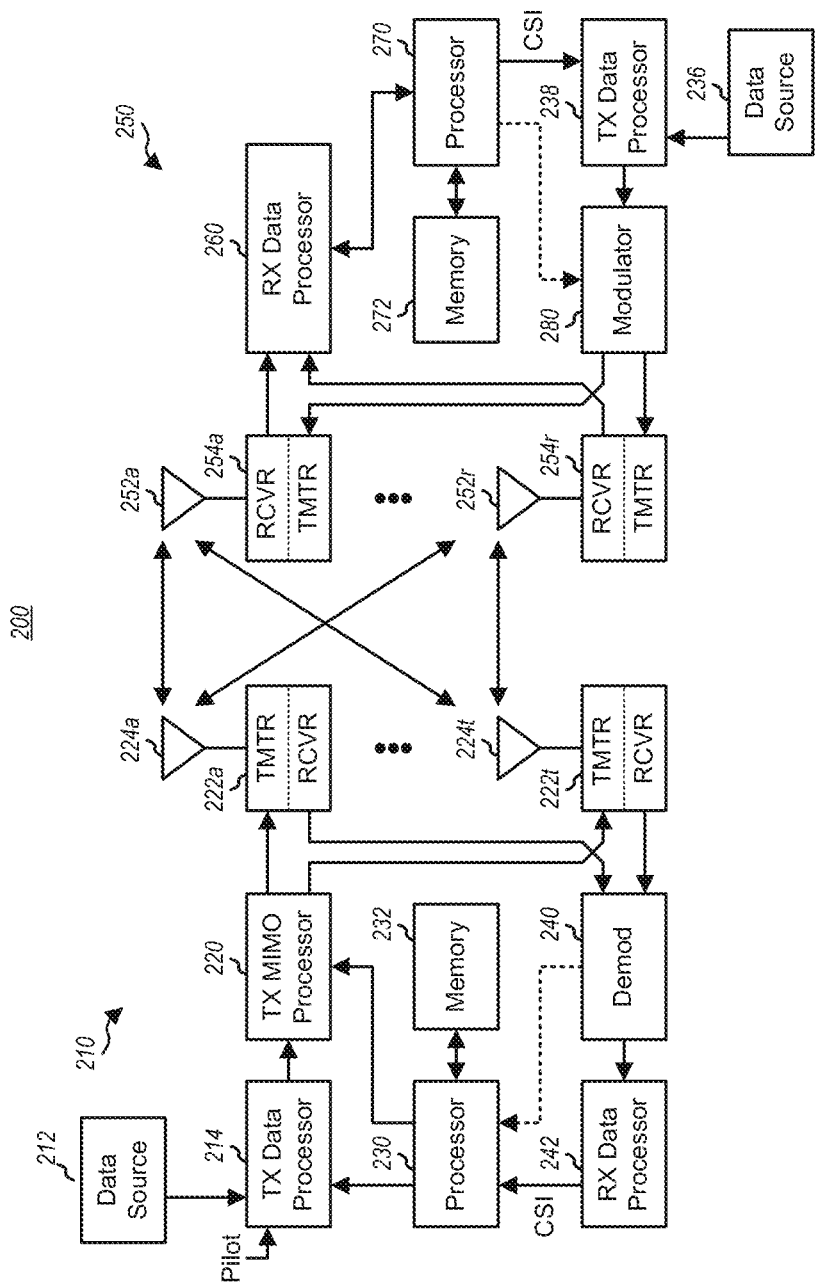
FIG. 2 is a block diagram of a transmitter system (also known as access network) and a receiver system (also known as user equipment or UE), in accordance with embodiments of the present invention.

FIG. 2 is a simplified block diagram of an embodiment of a transmitter system 210 (also known as the access network) and a receiver system 250 (also known as access terminal (AT) or user equipment (UE)) in a MIMO system 200. At the transmitter system 210, traffic data for a number of data streams is provided from a data source 212 to a transmit (TX) data processor 214.

In one embodiment, each data stream is transmitted over a respective transmit antenna. TX data processor 214 formats, codes, and interleaves the traffic data for each data stream based on a particular coding scheme selected for that data stream to provide coded data.

The coded data for each data stream may be multiplexed with pilot data using OFDM techniques. The pilot data is typically a known data pattern that is processed in a known manner and may be used at the receiver system to estimate the channel response. The multiplexed pilot and coded data for each data stream is then modulated (e.g., symbol mapped) based on a particular modulation scheme (e.g., BPSK, QPSK, M-PSK, or M-QAM) selected for that data stream to provide modulation symbols. The data rate, coding, and modulation for each data stream may be determined by instructions performed by processor 230.

The modulation symbols for all data streams are then provided to a TX MIMO processor 220, which may further process the modulation symbols (e.g., for OFDM). TX MIMO processor 220 then provides $N_T$ modulation symbol streams to $N_T$ transmitters (TMTR) 222a through 222t. In certain embodiments, TX MIMO processor 220 applies beamforming weights to the symbols of the data streams and to the antenna from which the symbol is being transmitted.

Each transmitter 222 receives and processes a respective symbol stream to provide one or more analog signals, and further conditions (e.g., amplifies, filters, and upconverts) the analog signals to provide a modulated signal suitable for transmission over the MIMO channel. $N_T$ modulated signals from transmitters 222a through 222t are then transmitted from $N_T$ antennas 224a through 224t, respectively.

At receiver system 250, the transmitted modulated signals are received by $N_R$ antennas 252a through 252r and the received signal from each antenna 252 is provided to a respective receiver (RCVR) 254a through 254r. Each receiver 254 conditions (e.g., filters, amplifies, and downconverts) a respective received signal, digitizes the conditioned signal to provide samples, and further processes the samples to provide a corresponding "received" symbol stream.

An RX data processor 260 then receives and processes the $N_R$ received symbol streams from $N_R$ receivers 254 based on a particular receiver processing technique to provide $N_T$ "detected" symbol streams. The RX data processor 260 then demodulates, deinterleaves, and decodes each detected symbol stream to recover the traffic data for the data stream. The processing by RX data processor 260 is complementary to that performed by TX MIMO processor 220 and TX data processor 214 at transmitter system 210.

A processor 270 periodically determines which pre-coding matrix to use (discussed below). Processor 270 formulates a reverse link message comprising a matrix index portion and a rank value portion.

The reverse link message may comprise various types of information regarding the communication link and/or the received data stream. The reverse link message is then processed by a TX data processor 238, which also receives traffic data for a number of data streams from a data source 236, modulated by a modulator 280, conditioned by transmitters 254a through 254r, and transmitted back to transmitter system 210.

At transmitter system 210, the modulated signals from receiver system 250 are received by antennas 224, conditioned by receivers 222, demodulated by a demodulator 240, and processed by a RX data processor 242 to extract the reserve link message transmitted by the receiver system 250. Processor 230 then determines which pre-coding matrix to use for determining the beamforming weights then processes the extracted message.

Memory 232 may be used to temporarily store some buffered/computational data from 240 or 242 through Processor 230, store some buffed data from 212, or store some specific program codes. And Memory 272 may be used to temporarily store some buffered/computational data from 260 through Processor 270, store some buffed data from 236, or store some specific program codes.

Figure 3:
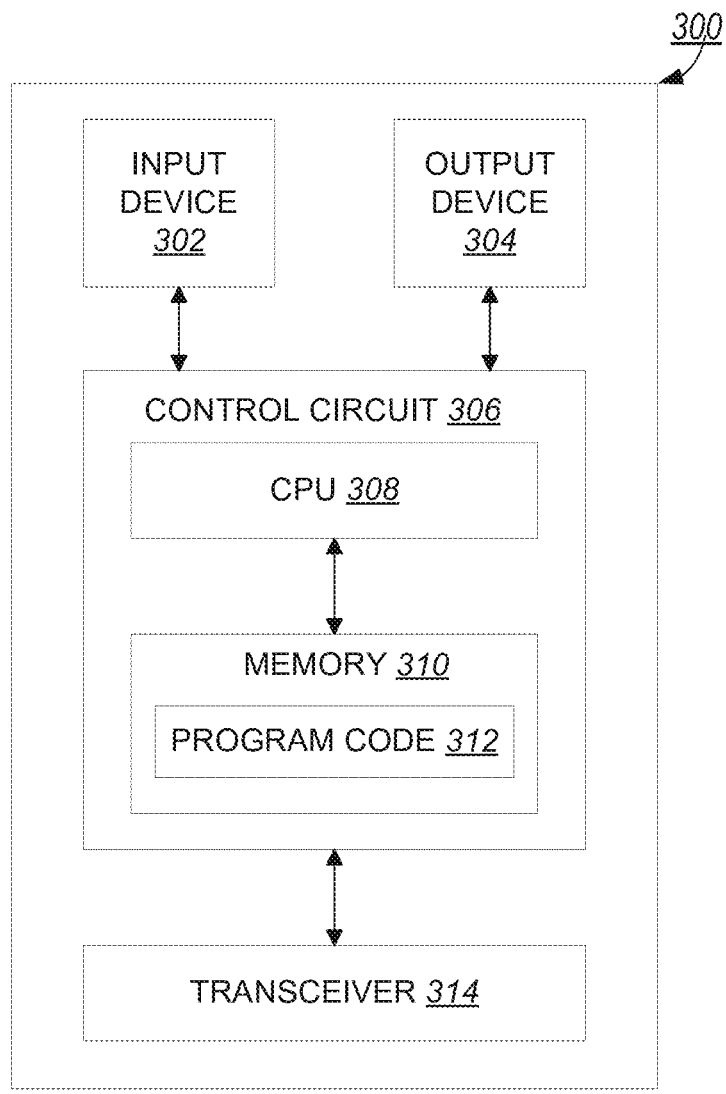
FIG. 3 is a functional block diagram of a communication system, in accordance with embodiments of the present invention.

Turning to FIG. 3, this figure shows an alternative simplified functional block diagram of a communication device according to one embodiment of the invention. As shown in FIG. 3, the communication device 300 in a wireless communication system can be utilized for realizing the UEs (or ATs) 116 and 122 in FIG. 1, and the wireless communications system is preferably the NR system. The communication device 300 may include an input device 302, an output device 304, a control circuit 306, a central processing unit (CPU) 308, a memory 310, a program code 312, and a transceiver 314. The control circuit 306 executes the program code 312 in the memory 310 through the CPU 308, thereby controlling an operation of the communications device 300. The communications device 300 can receive signals input by a user through the input device 302, such as a keyboard or keypad, and can output images and sounds through the output device 304, such as a monitor or speakers. The transceiver 314 is used to receive and transmit wireless signals, delivering received signals to the control circuit 306, and outputting signals generated by the control circuit 306 wirelessly.

Figure 4:
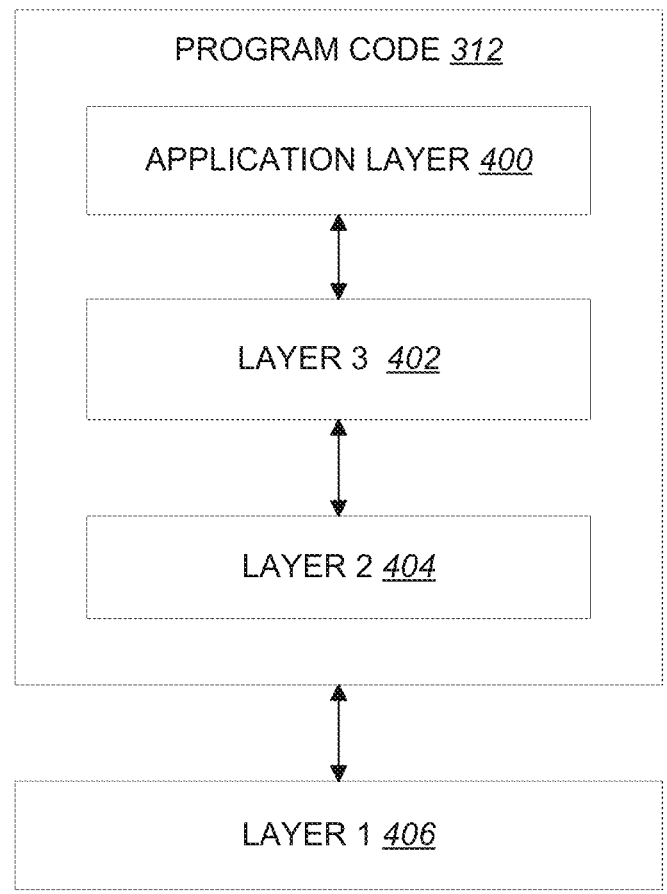
FIG. 4 is a functional block diagram of the program code of FIG. 3, in accordance with embodiments of the present invention.

FIG. 4 is a simplified block diagram of the program code 312 shown in FIG. 3 in accordance with an embodiment of the invention. In this embodiment, the program code 312 includes an application layer 400, a Layer 3 portion 402, and a Layer 2 portion 404, and is coupled to a Layer 1 portion 406. The Layer 3 portion 402 generally performs radio resource control. The Layer 2 portion 404 generally performs link control. The Layer 1 portion 406 generally performs physical connections.

For LTE, LTE-A, or NR systems, the Layer 2 portion 404 may include a Radio Link Control (RLC) layer and a Medium Access Control (MAC) layer. The Layer 3 portion 402 may include a Radio Resource Control (RRC) layer.

Any two or more than two of the following paragraphs, (sub-)bullets, points, actions, or claims described in each invention may be combined logically, reasonably, and properly to form a specific method.

Any sentence, paragraph, (sub-)bullet, point, action, or claim described in each of the following invention may be implemented independently and separately to form a specific method. Dependency, e.g., "based on", "more specifically", etc., in the following invention is just one possible embodiment which would not restrict the specific method.

The work item on NR Multicast and Broadcast Services (MBS) is described in [4]. Several parts from [4] are quoted below:

************************************ Quotation Start [4]
************************************

3 Justification

A discussion on 5G Broadcast evolution in RAN took place between RAN #78 and RAN #80, summarizing the technical attributes of "terrestrial broadcast" and "mixed mode multicast", leading to a recommendation to proceed with a study on "terrestrial broadcast" in Rel-16, while leaving the standardization of "mixed mode" multicast/broadcast to further releases. The LTE Rel-16 WI on enhanced EN-TV was approved in RAN #83, targeting the introduction of new frame structures with new CPs and the related designs. The main attributes of "terrestrial broadcast" are broadcast only, DL-only, large and static transmission areas typically achieved with High-Power High-Tower deployments.

No broadcast/multicast feature support is specified in the first two NR releases, i.e. Rel-15 and Rel-16. Nevertheless, there are important use cases for which broadcast/multicast could provide substantial improvements, especially in regards to system efficiency and user experience.

A study item on the Architectural enhancements for 5G multicast-broadcast services has been approved in SP-190625 and it is ongoing.

Objective A of the SA2 SI is about Enabling general MBS services over 5GS and the uses cases identified that could benefit from this feature include (but are not limited to) public safety and mission critical, V2X applications, transparent IPv4/IPv6 multicast delivery, IPTV, software delivery over wireless, group communications and IoT applications.

This WI aims to provide the support in RAN for Objective A, consistently with TR 23.757. Support of Objective B (e.g., linear TV, Live, smart TV, and managed and OTT content, radio services) is not in scope of this WI, i.e., we should not design the RAN part of the system to fulfil Objective B, however it is possible that solutions designed for Objective A would enable efficient radio resource utilization for services supported in Objective B, and we aim for forward compatibility towards Objective B were possible.

In particular, for public safety and mission critical, we should take into account as much as possible design goals identified during the SA6 Study on enhanced Mission Critical (MC) services over 5G multicast-broadcast system (SP-190726) as captured in TR 23.774 and requirements identified by SA1 in TS22.261, clause 6.13.2, provided that the RAN system complexity is manageable.

4 Objective
4.1 Objective of SI or Core part WI or Testing part WI
The set of objectives includes:
  Specify RAN basic functions for broadcast/multicast for UEs in RRC_CONNECTED state [RAN1, RAN2, RAN3]:
    Specify a group scheduling mechanism to allow UEs to receive Broadcast/Multicast service [RAN1, RAN2] This objective includes specifying necessary enhancements that are required to enable simultaneous operation with unicast reception.
    Specify support for dynamic change of Broadcast/Multicast service delivery between multicast (PTM) and unicast (PTP) with service continuity for a given UE [RAN2, RAN3]
    Specify support for basic mobility with service continuity [RAN2, RAN3]
    Assuming that the necessary coordination function (like functions hosted by MCE, if any) resides in the gNB-CU, specify required changes on the RAN architecture and interfaces, considering the results of the SA2 SI on Broadcast/Multicast (SP-190625) [RAN3]
    Specify required changes to improve reliability of Broadcast/Multicast service, e.g., by UL feedback. The level of reliability should be based on the requirements of the application/service provided. [RAN1, RAN2]
    Study the support for dynamic control of the Broadcast/Multicast transmission area within one gNB-DU and specify what is needed to enable it, if anything [RAN2, RAN3]
  Specify RAN basic functions for broadcast/multicast for UEs in RRC_IDLE/RRC_INACTIVE states [RAN2, RAN1]:
    Specify required changes to enable the reception of Point to Multipoint transmissions by UEs in RRC_IDLE/RRC_INACTIVE states, with the aim of keeping maximum commonality between RRC_CONNECTED state and RRC_IDLE/RRC_INACTIVE state for the configuration of PTM reception. [RAN2, RAN1].
  Note: the possibility of receiving Point to Multipoint transmissions by UEs in RRC_IDLE/RRC_INACTIVE states, without the need for those UEs to get the configuration of the PTM bearer carrying the Broadcast/Multicast service while in RRC CONNECTED state beforehand, is subject to verification of service subscription and authorization assumptions during the WI.

Restrictions and Assumptions:
Architecture: it is the one in Figure 4.1-1 in TR 23.757 v0.2.0: High level MBS architecture, with the further restriction that only NR in NG-RAN (i.e. connected to 5GC) is considered as RAT. Consequently, in addition to in NR SA, there should be no reasons preventing the use of the feature standardized in this WI in case of MR DC configurations in the MCG when the MN is a gNB (NE-DC, NR DC).

Physical layer: limit the scope of this WI to current Rel-15 numerologies, physical channels (PDCCH/PDSCH) and signals.

FR2: we assume that there are no issues to provide Multicast/Broadcast transmissions in FR2. If any enhancements is needed it should be treated with lower priority compared to the minimum set of objectives above.

In order to facilitate implementation and deployment of the feature, the overall implementation impact should be limited, and the UE complexity should be minimized (e.g., device hardware impact should be avoided).

SFN provides synchronized delivery of user plane packets over the air from different cells. No standardized support specifically for SFN, is provided in this WI. Any SFN operation is transparent to the UE, and any related synchronization is left to network implementation. The existing QCL framework (based on SSB and CSI-RS) is reused.

Flexible resource allocation between Unicast and Broadcast/Multicast services should be possible in this WI, but resource allocation up to 100% to Broadcast/Multicast is not guaranteed requirement in this WI.

No support of Free to air/receive only mode is provided in this WI.

Any design decisions taken for this WI in Release 17 shall not prevent introducing the following features in future Releases:
  Standardised support of SFN over multiple cells above gNB-DU level;
  Support of Free to air/receive only mode
  Resource allocation up to 100% to Broadcast/Multicast service.

Note: collaboration with SA2 is expected in due course.
************************************ Quotation End [4]
************************************
In NR, the procedures related to monitoring PDCCH on P(S)Cell and/or SCell for scheduling PDSCH and/or PUSCH on P(S)Cell and/or SCell are specified in TS 38.321 [2], and quoted below as a starting point for further enhancement.
************************************ Quotation Start [2]
************************************
3.1 Definitions
For the purposes of the present document, the terms and definitions given in TR 21.905 [1] and the following apply. A term defined in the present document takes precedence over the definition of the same term, if any, in TR 21.905 [1].
Dormant BWP: The dormant BWP is one of downlink BWPs configured by the network via dedicated RRC signaling. In the dormant BWP, the UE stop monitoring PDCCH on/for the SCell, but continues performing CSI measurements, Automatic Gain Control (AGC) and beam management, if configured.
DRX group: A group of Serving Cells that is configured by RRC and that have the same DRX Active Time.
HARQ information: HARQ information for DL-SCH, for UL-SCH, or for SL-SCH transmissions consists of New Data Indicator (NDI), Transport Block size (TBS), Redundancy Version (RV), and HARQ process ID.
IAB-donor: gNB that provides network access to UEs via a network of backhaul and access links.
IAB-node: RAN node that supports NR access links to UEs and NR backhaul links to parent nodes and child nodes.
Listen Before Talk: A procedure according to which transmissions are not performed if the channel is identified as being occupied, see TS 37.213 [18].
Msg3: Message transmitted on UL-SCH containing a C-RNTI MAC CE or CCCH SDU, submitted from upper layer and associated with the UE Contention Resolution Identity, as part of a Random Access procedure.

NR backhaul link: NR link used for backhauling between an IAB-node and an IAB-donor, and between IAB-nodes in case of a multi-hop backhauling.

NR sidelink communication: AS functionality enabling at least V2X Communication as defined in TS 23.287 [19], between two or more nearby UEs, using NR technology but not traversing any network node.

PDCCH occasion: A time duration (i.e. one or a consecutive number of symbols) during which the MAC entity is configured to monitor the PDCCH.

Serving Cell: A PCell, a PSCell, or an SCell in TS 38.331 [5].

Sidelink transmission information: Sidelink transmission information included in a SCI for a SL-SCH transmission as specified in clause 8.3 and 8.4 of TS 38.212 [9] consists of Sidelink HARQ information including NDI, RV, Sidelink process ID, HARQ feedback enabled/disabled indicator, Sidelink identification information including cast type indicator, Source Layer-1 ID and Destination Layer-1 ID, and Sidelink other information including CSI request, a priority, a communication range requirement and Zone ID.

Special Cell: For Dual Connectivity operation the term Special Cell refers to the PCell of the MCG or the PSCell of the SCG depending on if the MAC entity is associated to the MCG or the SCG, respectively. Otherwise the term Special Cell refers to the PCell. A Special Cell supports PUCCH transmission and contention-based Random Access, and is always activated.

Timing Advance Group: A group of Serving Cells that is configured by RRC and that, for the cells with a UL configured, using the same timing reference cell and the same Timing Advance value. A Timing Advance Group containing the SpCell of a MAC entity is referred to as Primary Timing Advance Group (PTAG), whereas the term Secondary Timing Advance Group (STAG) refers to other TAGs.

V2X sidelink communication: AS functionality enabling V2X Communication as defined in TS 23.285 [20], between nearby UEs, using E-UTRA technology but not traversing any network node.

> NOTE: A timer is running once it is started, until it is stopped or until it expires; otherwise it is not running A timer can be started if it is not running or restarted if it is running A Timer is always started or restarted from its initial value. The duration of a timer is not updated until it is stopped or expires (e.g., due to BWP switching). When the MAC entity applies zero value for a timer, the timer shall be started and immediately expire unless explicitly stated otherwise.

\*\*\*\*\*\*\*\*\*\*\*\*\*\*\*\*\*\*\*\*\*\*\*\*\*\*\*\*\*\*\*\*\*\*\*\*\*\*\*\* Next Quotation [2]
\*\*\*\*\*\*\*\*\*\*\*\*\*\*\*\*\*\*\*\*\*\*\*\*\*\*\*\*\*\*\*\*\*\*\*\*\*\*\*\*

4.2 MAC Architecture
4.2.1 General
This clause describes a model of the MAC i.e. it does not specify or restrict implementations.
RRC is in control of the MAC configuration.
4.2.2 MAC Entities
The MAC entity of the UE handles the following transport channels:
  Broadcast Channel (BCH);
  Downlink Shared Channel(s) (DL-SCH);
  Paging Channel (PCH);
  Uplink Shared Channel(s) (UL-SCH);
  Random Access Channel(s) (RACH).
When the UE is configured with SCG, two MAC entities are configured to the UE: one for the MCG and one for the SCG. When the UE is configured with DAPS handover, two MAC entities are used by the UE: one for the source cell (source MAC entity) and one for the target cell (target MAC entity).

The functions of the different MAC entities in the UE operate independently unless otherwise specified. The timers and parameters used in each MAC entity are configured independently unless otherwise specified. The Serving Cells, C-RNTI, radio bearers, logical channels, upper and lower layer entities, LCGs, and HARQ entities considered by each MAC entity refer to those mapped to that MAC entity unless otherwise specified.

If the MAC entity is configured with one or more SCells, there are multiple DL-SCH and there may be multiple UL-SCH as well as multiple RACH per MAC entity; one DL-SCH, one UL-SCH, and one RACH on the SpCell, one DL-SCH, zero or one UL-SCH and zero or one RACH for each SCell.

If the MAC entity is not configured with any SCell, there is one DL-SCH, one UL-SCH, and one RACH per MAC entity.

Figure 5:
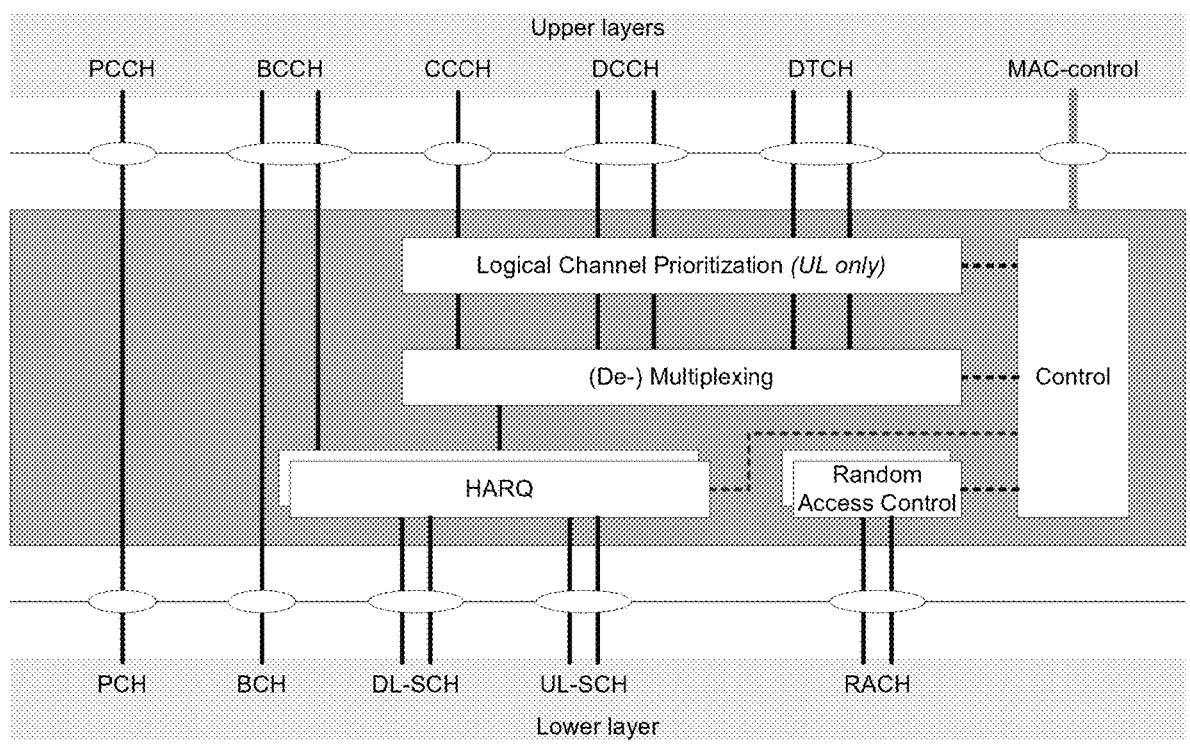
FIG. 5 is a reproduction of Figure 4.2.2-1 from 3GPP TS 38.321 V16.3.0, showing MAC structure overview, illustrating one possible structure of the MAC entity when SCG is not configured and for each MAC entity during DAPS handover.

FIG. 5 is a reproduction of Figure 4.2.2-1 from 3GPP TS 38.321 V16.3.0, showing MAC structure overview, illustrating one possible structure of the MAC entity when SCG is not configured and for each MAC entity during DAPS handover.

Figure 6:
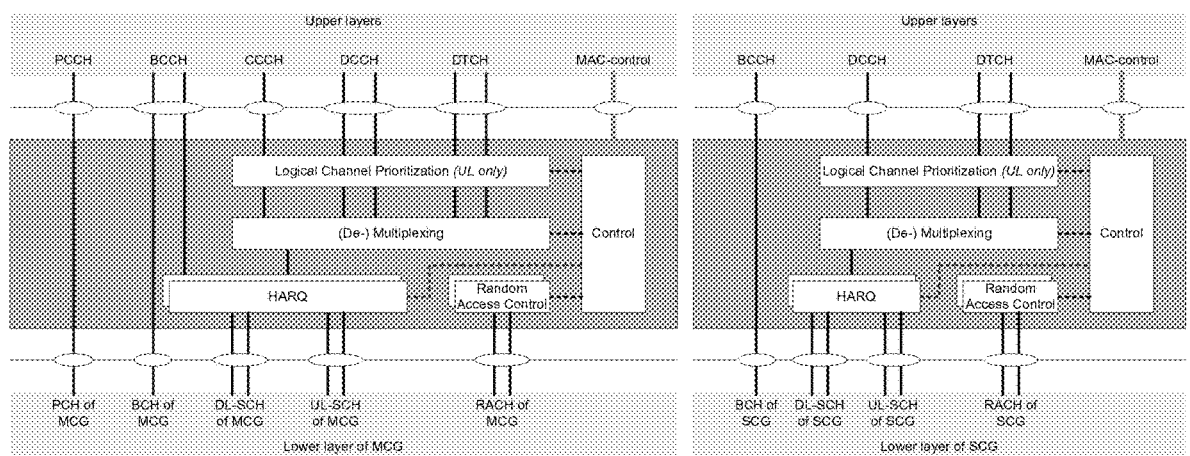
FIG. 6 is a reproduction of Figure 4.2.2-2 from 3GPP TS 38.321 V16.3.0, showing MAC structure overview with two MAC entities, illustrating one possible structure for MAC entities when MCG and SCG are configured.

FIG. 6 is a reproduction of Figure 4.2.2-2 from 3GPP TS 38.321 V16.3.0, showing MAC structure overview with two MAC entities, illustrating one possible structure for MAC entities when MCG and SCG are configured.

\*\*\*\*\*\*\*\*\*\*\*\*\*\*\*\*\*\*\*\*\*\*\*\*\*\*\*\*\*\*\*\*\*\*\*\*\*\*\*\* Next Quotation [2]
\*\*\*\*\*\*\*\*\*\*\*\*\*\*\*\*\*\*\*\*\*\*\*\*\*\*\*\*\*\*\*\*\*\*\*\*\*\*\*\*

4.5 Channel Structure
4.5.1 General
The MAC sublayer operates on the channels defined below; transport channels are SAPs between MAC and Layer 1, logical channels are SAPs between MAC and RLC.
4.5.2 Transport Channels
The MAC sublayer uses the transport channels listed in Table 4.5.2-1 below.

TABLE 4.5.2-1

Transport channels used by MAC

| Transport channel name | Acronym | Downlink | Uplink | Sidelink |
|---|---|---|---|---|
| Broadcast Channel | BCH | X | | |
| Downlink Shared Channel | DL-SCH | X | | |
| Paging Channel | PCH | X | | |
| Uplink Shared Channel | UL-SCH | | X | |
| Random Access Channel | RACH | | X | |
| Sidelink Broadcast Channel | SL-BCH | | | X |
| Sidelink Shared Channel | SL-SCH | | | X |

4.5.3 Logical Channels
The MAC sublayer provides data transfer services on logical channels. To accommodate different kinds of data transfer services, multiple types of logical channels are defined i.e. each supporting transfer of a particular type of information. Each logical channel type is defined by what type of information is transferred.
The MAC sublayer provides the control and traffic channels listed in Table 4.5.3-1 below.

TABLE 4.5.3-1

Logical channels provided by MAC.

| Logical channel name | Acronym | Control channel | Traffic channel |
|---|---|---|---|
| Broadcast Control Channel | BCCH | X | |
| Paging Control Channel | PCCH | X | |
| Common Control Channel | CCCH | X | |

TABLE 4.5.3-1-continued

Logical channels provided by MAC.

| Logical channel name | Acronym | Control channel | Traffic channel |
|---|---|---|---|
| Dedicated Control Channel | DCCH | X | |
| Dedicated Traffic Channel | DTCH | | X |
| Sidelink Broadcast Control Channel | SBCCH | X | |
| Sidelink Control Channel | SCCH | X | |
| Sidelink Traffic Channel | STCH | | X |

4.5.4 Mapping of Transport Channels to Logical Channels
4.5.4.1 General
The MAC entity is responsible for mapping logical channels onto transport channels. This mapping depends on the multiplexing that is configured by RRC.
4.5.4.2 Uplink Mapping
The uplink logical channels can be mapped as described in Table 4.5.4.2-1.

TABLE 4.5.4.2-1

Uplink channel mapping.

| | Transport channel | |
|---|---|---|
| Logical channel | UL-SCH | RACH |
| CCCH | X | |
| DCCH | X | |
| DTCH | X | |

4.5.4.3 Downlink Mapping
The downlink logical channels can be mapped as described in Table 4.5.4.3-1.

TABLE 4.5.4.3-1

Downlink channel mapping.

| | Transport channel | | |
|---|---|---|---|
| Logical channel | BCH | PCH | DL-SCH |
| BCCH | X | | X |
| PCCH | | X | |
| CCCH | | | X |
| DCCH | | | X |
| DTCH | | | X |

\*\*\*\*\*\*\*\*\*\*\*\*\*\*\*\*\*\*\*\*\*\*\*\*\*\*\*\*\*\*\*\*\*\*\*\*\*\* Next Quotation [2]
\*\*\*\*\*\*\*\*\*\*\*\*\*\*\*\*\*\*\*\*\*\*\*\*\*\*\*\*\*\*\*\*\*\*\*\*\*\*

5.3 DL-SCH Data Transfer
5.3.1 DL Assignment Reception
Downlink assignments received on the PDCCH both indicate that there is a transmission on a DL-SCH for a particular MAC entity and provide the relevant HARQ information. When the MAC entity has a C-RNTI, Temporary C-RNTI, or CS-RNTI, the MAC entity shall for each PDCCH occasion during which it monitors PDCCH and for each Serving Cell:
    1> if a downlink assignment for this PDCCH occasion and this Serving Cell has been received on the PDCCH for the MAC entity's C-RNTI, or Temporary C-RNTI:
        2> if this is the first downlink assignment for this Temporary C-RNTI:
            3> consider the NDI to have been toggled.
        2> if the downlink assignment is for the MAC entity's C-RNTI, and if the previous downlink assignment indicated to the HARQ entity of the same HARQ process was either a downlink assignment received for the MAC entity's CS-RNTI or a configured downlink assignment:
            3> consider the NDI to have been toggled regardless of the value of the NDI.
        2> indicate the presence of a downlink assignment and deliver the associated HARQ information to the HARQ entity.
    1> else if a downlink assignment for this PDCCH occasion has been received for this Serving Cell on the PDCCH for the MAC entity's CS-RNTI:
        2> if the NDI in the received HARQ information is 1:
            3> consider the NDI for the corresponding HARQ process not to have been toggled;
            3> indicate the presence of a downlink assignment for this Serving Cell and deliver the associated HARQ information to the HARQ entity.
        2> if the NDI in the received HARQ information is 0:
            3> if PDCCH contents indicate SPS deactivation:
                4> clear the configured downlink assignment for this Serving Cell (if any);
                4> if the timeAlignmentTimer, associated with the TAG containing the Serving Cell on which the HARQ feedback is to be transmitted, is running:
                    5> indicate a positive acknowledgement for the SPS deactivation to the physical layer.
            3> else if PDCCH content indicates SPS activation:
                4> store the downlink assignment for this Serving Cell and the associated HARQ information as configured downlink assignment;
                4> initialise or re-initialise the configured downlink assignment for this Serving Cell to start in the associated PDSCH duration and to recur according to rules in clause 5.8.1;

For each Serving Cell and each configured downlink assignment, if configured and activated, the MAC entity shall:
    1> if the PDSCH duration of the configured downlink assignment does not overlap with the PDSCH duration of a downlink assignment received on the PDCCH for this Serving Cell:
        2> instruct the physical layer to receive, in this PDSCH duration, transport block on the DL-SCH according to the configured downlink assignment and to deliver it to the HARQ entity;
        2> set the HARQ Process ID to the HARQ Process ID associated with this PDSCH duration;
        2> consider the NDI bit for the corresponding HARQ process to have been toggled;
        2> indicate the presence of a configured downlink assignment and deliver the stored HARQ information to the HARQ entity.

For configured downlink assignments without harq-ProcID-Offset, the HARQ Process ID associated with the slot where the DL transmission starts is derived from the following equation:

HARQ Process ID=[floor(CURRENT_slot×10/(numberOfSlotsPerFrame×periodicity))]modulo nrof-HARQ-Processes where CURRENT_slot=[(SFN×numberOfSlotsPerFrame)+ slot number in the frame] and numberOfSlotsPerFrame refers to the number of consecutive slots per frame as specified in TS 38.211 [8].

For configured downlink assignments with harq-ProcID-Offset, the HARQ Process ID associated with the slot where the DL transmission starts is derived from the following equation:

HARQ Process ID=[floor (CURRENT_slot×10/ (numberOfSlotsPerFrame×periodicity))]modulo nrofHARQ-Processes+harq-ProcID-Offset where CURRENT_slot=[(SFN×numberOfSlotsPerFrame)+ slot number in the frame] and numberOfSlotsPerFrame refers to the number of consecutive slots per frame as specified in TS 38.211 [8].

NOTE 1: In case of unaligned SFN across carriers in a cell group, the SFN of the concerned Serving Cell is used to calculate the HARQ Process ID used for configured downlink assignments.

NOTE 2: CURRENT_slot refers to the slot index of the first transmission occasion of a bundle of configured downlink assignment.

When the MAC entity needs to read BCCH, the MAC entity may, based on the scheduling information from RRC:

1> if a downlink assignment for this PDCCH occasion has been received on the PDCCH for the SI-RNTI;
   2> indicate a downlink assignment and redundancy version for the dedicated broadcast HARQ process to the HARQ entity.

5.3.2 HARQ Operation
5.3.2.1 HARQ Entity

The MAC entity includes a HARQ entity for each Serving Cell, which maintains a number of parallel HARQ processes. Each HARQ process is associated with a HARQ process identifier. The HARQ entity directs HARQ information and associated TBs received on the DL-SCH to the corresponding HARQ processes (see clause 5.3.2.2).

The number of parallel DL HARQ processes per HARQ entity is specified in TS 38.214 [7]. The dedicated broadcast HARQ process is used for BCCH.

The HARQ process supports one TB when the physical layer is not configured for downlink spatial multiplexing. The HARQ process supports one or two TBs when the physical layer is configured for downlink spatial multiplexing.

When the MAC entity is configured with pdsch-AggregationFactor>1, the parameter pdsch-AggregationFactor provides the number of transmissions of a TB within a bundle of the downlink assignment. Bundling operation relies on the HARQ entity for invoking the same HARQ process for each transmission that is part of the same bundle. After the initial transmission, pdsch-AggregationFactor-1 HARQ retransmissions follow within a bundle.

The MAC entity shall:

1> if a downlink assignment has been indicated:
   2> allocate the TB(s) received from the physical layer and the associated HARQ information to the HARQ process indicated by the associated HARQ information.
1> if a downlink assignment has been indicated for the broadcast HARQ process:
   2> allocate the received TB to the broadcast HARQ process.

5.3.2.2 HARQ Process

When a transmission takes place for the HARQ process, one or two (in case of downlink spatial multiplexing) TBs and the associated HARQ information are received from the HARQ entity.

For each received TB and associated HARQ information, the HARQ process shall:

1> if the NDI, when provided, has been toggled compared to the value of the previous received transmission corresponding to this TB; or
1> if the HARQ process is equal to the broadcast process, and this is the first received transmission for the TB according to the system information schedule indicated by RRC; or
1> if this is the very first received transmission for this TB (i.e. there is no previous NDI for this TB):
   2> consider this transmission to be a new transmission.
1> else:
   2> consider this transmission to be a retransmission.

The MAC entity then shall:

1> if this is a new transmission:
   2> attempt to decode the received data.
1> else if this is a retransmission:
   2> if the data for this TB has not yet been successfully decoded:
      3> instruct the physical layer to combine the received data with the data currently in the soft buffer for this TB and attempt to decode the combined data.
1> if the data which the MAC entity attempted to decode was successfully decoded for this TB; or
1> if the data for this TB was successfully decoded before:
   2> if the HARQ process is equal to the broadcast process:
      3> deliver the decoded MAC PDU to upper layers.
   2> else if this is the first successful decoding of the data for this TB:
      3> deliver the decoded MAC PDU to the disassembly and demultiplexing entity.
1> else:
   2> instruct the physical layer to replace the data in the soft buffer for this TB with the data which the MAC entity attempted to decode.
1> if the HARQ process is associated with a transmission indicated with a Temporary C-RNTI and the Contention Resolution is not yet successful (see clause 5.1.5); or
1> if the HARQ process is associated with a transmission indicated with a MSGB-RNTI and the Random Access procedure is not yet successfully completed (see clause 5.1.4a); or
1> if the HARQ process is equal to the broadcast process; or
1> if the timeAlignmentTimer, associated with the TAG containing the Serving Cell on which the HARQ feedback is to be transmitted, is stopped or expired:
   2> not instruct the physical layer to generate acknowledgement(s) of the data in this TB.
1> else:
   2> instruct the physical layer to generate acknowledgement(s) of the data in this TB.

The MAC entity shall ignore NDI received in all downlink assignments on PDCCH for its Temporary C-RNTI when determining if NDI on PDCCH for its C-RNTI has been toggled compared to the value in the previous transmission.

NOTE: If the MAC entity receives a retransmission with a TB size different from the last TB size signalled for this TB, the UE behavior is left up to UE implementation.

5.3.3 Disassembly and Demultiplexing

The MAC entity shall disassemble and demultiplex a MAC PDU as defined in clauses 6.1.2 and 6.1.5a.

*************************************** Next Quotation [2]
***************************************

5.7 Discontinuous Reception (DRX)

The MAC entity may be configured by RRC with a DRX functionality that controls the UE's PDCCH monitoring activity for the MAC entity's C-RNTI, CI-RNTI, CS-RNTI, INT-RNTI, SFI-RNTI, SP-CSI-RNTI, TPC-PUCCH-RNTI, TPC-PUSCH-RNTI, TPC-SRS-RNTI, and AI-RNTI. When using DRX operation, the MAC entity shall also monitor PDCCH according to requirements found in other clauses of this specification. When in RRC_CONNECTED, if DRX is configured, for all the activated Serving Cells, the MAC entity may monitor the PDCCH discontinuously using the DRX operation specified in this clause; otherwise the MAC entity shall monitor the PDCCH as specified in TS 38.213 [6].

NOTE 1: If Sidelink resource allocation mode 1 is configured by RRC, a DRX functionality is not configured.

RRC controls DRX operation by configuring the following parameters:

drx-onDurationTimer: the duration at the beginning of a DRX cycle;

drx-SlotOffset: the delay before starting the drx-onDurationTimer;

drx-InactivityTimer: the duration after the PDCCH occasion in which a PDCCH indicates a new UL or DL transmission for the MAC entity;

drx-RetransmissionTimerDL (per DL HARQ process except for the broadcast process): the maximum duration until a DL retransmission is received;

drx-RetransmissionTimerUL (per UL HARQ process): the maximum duration until a grant for UL retransmission is received;

drx-LongCycleStartOffset: the Long DRX cycle and drx-StartOffset which defines the subframe where the Long and Short DRX cycle starts;

drx-ShortCycle (optional): the Short DRX cycle;

drx-ShortCycleTimer (optional): the duration the UE shall follow the Short DRX cycle;

drx-HARQ-RTT-TimerDL (per DL HARQ process except for the broadcast process): the minimum duration before a DL assignment for HARQ retransmission is expected by the MAC entity;

drx-HARQ-RTT-TimerUL (per UL HARQ process): the minimum duration before a UL HARQ retransmission grant is expected by the MAC entity;

ps-Wakeup (optional): the configuration to start associated drx-onDurationTimer in case DCP is monitored but not detected;

ps-TransmitOtherPeriodicCSI (optional): the configuration to report periodic CSI that is not L1-RSRP on PUCCH during the time duration indicated by drx-onDurationTimer in case DCP is configured but associated drx-onDurationTimer is not started;

ps-TransmitPeriodicL1-RSRP (optional): the configuration to transmit periodic CSI that is L1-RSRP on PUCCH during the time duration indicated by drx-onDurationTimer in case DCP is configured but associated drx-onDurationTimer is not started.

Serving Cells of a MAC entity may be configured by RRC in two DRX groups with separate DRX parameters. When RRC does not configure a secondary DRX group, there is only one DRX group and all Serving Cells belong to that one DRX group. When two DRX groups are configured, each Serving Cell is uniquely assigned to either of the two groups. The DRX parameters that are separately configured for each DRX group are: drx-onDurationTimer, drx-InactivityTimer. The DRX parameters that are common to the DRX groups are: drx-SlotOffset, drx-Retransmission TimerDL, drx-RetransmissionTimerUL, drx-LongCycleStartOffset, drx-ShortCycle (optional), drx-ShortCycleTimer (optional), drx-HARQ-RTT-TimerDL, and drx-HARQ-RTT-TimerUL.

When a DRX cycle is configured, the Active Time for Serving Cells in a DRX group includes the time while:

drx-onDurationTimer or drx-InactivityTimer configured for the DRX group is running; or drx-RetransmissionTimerDL or drx-RetransmissionTimerUL is running on any Serving Cell in the DRX group; or ra-ContentionResolutionTimer (as described in clause 5.1.5) or msgB-Response Window (as described in clause 5.1.4a) is running; or a Scheduling Request is sent on PUCCH and is pending (as described in clause 5.4.4); or a PDCCH indicating a new transmission addressed to the C-RNTI of the MAC entity has not been received after successful reception of a Random Access Response for the Random Access Preamble not selected by the MAC entity among the contention-based Random Access Preamble (as described in clauses 5.1.4 and 5.1.4a).

When DRX is configured, the MAC entity shall:

1> if a MAC PDU is received in a configured downlink assignment:
2> start the drx-HARQ-RTT-TimerDL for the corresponding HARQ process in the first symbol after the end of the corresponding transmission carrying the DL HARQ feedback;
2> stop the drx-RetransmissionTimerDL for the corresponding HARQ process.

1> if a MAC PDU is transmitted in a configured uplink grant and LBT failure indication is not received from lower layers:
2> start the drx-HARQ-RTT-TimerUL for the corresponding HARQ process in the first symbol after the end of the first transmission (within a bundle) of the corresponding PUSCH transmission;
2> stop the drx-RetransmissionTimerUL for the corresponding HARQ process at the first transmission (within a bundle) of the corresponding PUSCH transmission.

1> if a drx-HARQ-RTT-TimerDL expires:
2> if the data of the corresponding HARQ process was not successfully decoded:
3> start the drx-RetransmissionTimerDL for the corresponding HARQ process in the first symbol after the expiry of drx-HARQ-RTT-TimerDL.

1> if a drx-HARQ-RTT-TimerUL expires:
2> start the drx-RetransmissionTimerUL for the corresponding HARQ process in the first symbol after the expiry of drx-HARQ-RTT-TimerUL.

1> if a DRX Command MAC CE or a Long DRX Command MAC CE is received:
2> stop drx-onDurationTimer for each DRX group;
2> stop drx-InactivityTimer for each DRX group.

1> if drx-InactivityTimer for a DRX group expires:
  2> if the Short DRX cycle is configured:
    3> start or restart drx-ShortCycleTimer for this DRX group in the first symbol after the expiry of drx-InactivityTimer;
    3> use the Short DRX cycle for this DRX group.
  2> else:
    3> use the Long DRX cycle for this DRX group.
1> if a DRX Command MAC CE is received:
  2> if the Short DRX cycle is configured:
    3> start or restart drx-ShortCycleTimer for each DRX group in the first symbol after the end of DRX Command MAC CE reception;
    3> use the Short DRX cycle for each DRX group.
  2> else:
    3> use the Long DRX cycle for each DRX group.
1> if drx-ShortCycleTimer for a DRX group expires:
  2> use the Long DRX cycle for this DRX group.
1> if a Long DRX Command MAC CE is received:
  2> stop drx-ShortCycleTimer for each DRX group;
  2> use the Long DRX cycle for each DRX group.
1> if the Short DRX cycle is used for a DRX group, and [(SFN×10)+subframe number] modulo (drx-Short-Cycle)=(drx-StartOffset) modulo (drx-ShortCycle):
  2> start drx-onDurationTimer for this DRX group after drx-SlotOffset from the beginning of the subframe.
1> if the Long DRX cycle is used for a DRX group, and [(SFN×10)+subframe number] modulo (drx–Long-Cycle)=drx-StartOffset:
  2> if DCP monitoring is configured for the active DL BWP as specified in TS 38.213 [6], clause 10.3:
    3> if DCP indication associated with the current DRX cycle received from lower layer indicated to start drx-onDurationTimer, as specified in TS 38.213 [6]; or
    3> if all DCP occasion(s) in time domain, as specified in TS 38.213 [6], associated with the current DRX cycle occurred in Active Time considering grants/assignments/DRX Command MAC CE/Long DRX Command MAC CE received and Scheduling Request sent until 4 ms prior to start of the last DCP occasion, or during a measurement gap, or when the MAC entity monitors for a PDCCH transmission on the search space indicated by recoverySearchSpaceId of the SpCell identified by the C-RNTI while the ra-Response Window is running (as specified in clause 5.1.4); or
    3> if ps-Wakeup is configured with value true and DCP indication associated with the current DRX cycle has not been received from lower layers:
      4> start drx-onDurationTimer after drx-SlotOffset from the beginning of the subframe.
  2> else:
    3> start drx-onDurationTimer for this DRX group after drx-SlotOffset from the beginning of the subframe.
NOTE 2: In case of unaligned SFN across carriers in a cell group, the SFN of the SpCell is used to calculate the DRX duration.
1> if a DRX group is in Active Time:
  2> monitor the PDCCH on the Serving Cells in this DRX group as specified in TS 38.213 [6];
  2> if the PDCCH indicates a DL transmission:
    3> start the drx-HARQ-RTT-TimerDL for the corresponding HARQ process in the first symbol after the end of the corresponding transmission carrying the DL HARQ feedback;
NOTE 3: When HARQ feedback is postponed by PDSCH-to-HARQ_feedback timing indicating a non-numerical k1 value, as specified in TS 38.213 [6], the corresponding transmission opportunity to send the DL HARQ feedback is indicated in a later PDCCH requesting the HARQ-ACK feedback.
    3> stop the drx-RetransmissionTimerDL for the corresponding HARQ process.
    3> if the PDSCH-to-HARQ_feedback timing indicate a non-numerical k1 value as specified in TS 38.213 [6]:
      4> start the drx-RetransmissionTimerDL in the first symbol after the PDSCH transmission for the corresponding HARQ process.
  2> if the PDCCH indicates a UL transmission:
    3> start the drx-HARQ-RTT-TimerUL for the corresponding HARQ process in the first symbol after the end of the first transmission (within a bundle) of the corresponding PUSCH transmission;
    3> stop the drx-RetransmissionTimerUL for the corresponding HARQ process.
  2> if the PDCCH indicates a new transmission (DL or UL) on a Serving Cell in this DRX group:
    3> start or restart drx-InactivityTimer for this DRX group in the first symbol after the end of the PDCCH reception.
  2> if a HARQ process receives downlink feedback information and acknowledgement is indicated:
    3> stop the drx-RetransmissionTimerUL for the corresponding HARQ process.
1> if DCP monitoring is configured for the active DL BWP as specified in TS 38.213 [6], clause 10.3; and
1> if the current symbol n occurs within drx-onDurationTimer duration; and
1> if drx-onDurationTimer associated with the current DRX cycle is not started as specified in this clause:
  2> if the MAC entity would not be in Active Time considering grants/assignments/DRX Command MAC CE/Long DRX Command MAC CE received and Scheduling Request sent until 4 ms prior to symbol n when evaluating all DRX Active Time conditions as specified in this clause:
    3> not transmit periodic SRS and semi-persistent SRS defined in TS 38.214 [7];
    3> not report semi-persistent CSI configured on PUSCH;
    3> if ps-TransmitPeriodicL1-RSRP is not configured with value true:
      4> not report periodic CSI that is L1-RSRP on PUCCH.
    3> if ps-TransmitOtherPeriodicCSI is not configured with value true:
      4> not report periodic CSI that is not L1-RSRP on PUCCH.
1> else:
  2> in current symbol n, if a DRX group would not be in Active Time considering grants/assignments scheduled on Serving Cell(s) in this DRX group and DRX Command MAC CE/Long DRX Command MAC CE received and Scheduling Request sent until 4 ms prior to symbol n when evaluating all DRX Active Time conditions as specified in this clause:

3> not transmit periodic SRS and semi-persistent SRS defined in TS 38.214 [7] in this DRX group;

3> not report CSI on PUCCH and semi-persistent CSI configured on PUSCH in this DRX group.

2> if CSI masking (csi-Mask) is setup by upper layers:

3> in current symbol n, if drx-onDurationTimer of a DRX group would not be running considering grants/assignments scheduled on Serving Cell(s) in this DRX group and DRX Command MAC CE/Long DRX Command MAC CE received until 4 ms prior to symbol n when evaluating all DRX Active Time conditions as specified in this clause; and 4> not report CSI on PUCCH in this DRX group.

NOTE 4: If a UE multiplexes a CSI configured on PUCCH with other overlapping UCI(s) according to the procedure specified in TS 38.213 [6] clause 9.2.5 and this CSI multiplexed with other UCI(s) would be reported on a PUCCH resource outside DRX Active Time of the DRX group in which this PUCCH is configured, it is up to UE implementation whether to report this CSI multiplexed with other UCI(s).

Regardless of whether the MAC entity is monitoring PDCCH or not on the Serving Cells in a DRX group, the MAC entity transmits HARQ feedback, aperiodic CSI on PUSCH, and aperiodic SRS defined in TS 38.214 [7] on the Serving Cells in the DRX group when such is expected. The MAC entity needs not to monitor the PDCCH if it is not a complete PDCCH occasion (e.g., the Active Time starts or ends in the middle of a PDCCH occasion).

*************************************** Next Quotation [2]
***************************************

5.15 Bandwidth Part (BWP) operation
5.15.1 Downlink and Uplink

In addition to clause 12 of TS 38.213 [6], this clause specifies requirements on BWP operation.

A Serving Cell may be configured with one or multiple BWPs, and the maximum number of BWP per Serving Cell is specified in TS 38.213 [6].

The BWP switching for a Serving Cell is used to activate an inactive BWP and deactivate an active BWP at a time. The BWP switching is controlled by the PDCCH indicating a downlink assignment or an uplink grant, by the bwp-InactivityTimer, by RRC signalling, or by the MAC entity itself upon initiation of Random Access procedure or upon detection of consistent LBT failure on SpCell. Upon RRC (re-)configuration of firstActiveDownlinkBWP-Id and/or firstActiveUplinkBWP-Id for SpCell or activation of an SCell, the DL BWP and/or UL BWP indicated by firstActiveDownlinkBWP-Id and/or firstActiveUplinkBWP-Id respectively (as specified in TS 38.331 [5]) is active without receiving PDCCH indicating a downlink assignment or an uplink grant. The active BWP for a Serving Cell is indicated by either RRC or PDCCH (as specified in TS 38.213 [6]). For unpaired spectrum, a DL BWP is paired with a UL BWP, and BWP switching is common for both UL and DL.

For each SCell a dormant BWP may be configured with dormantBWP-Id by RRC signalling as described in TS 38.331 [5]. Entering or leaving dormant BWP for SCells is done by BWP switching per SCell or per dormancy SCell group based on instruction from PDCCH (as specified in TS 38.213 [6]). The dormancy SCell group configurations are configured by RRC signalling as described in TS 38.331 [5]. Upon reception of the PDCCH indicating leaving dormant BWP, the DL BWP indicated by firstOutsideActiveTimeBWP-Id or by firstWithinActiveTimeBWP-Id (as specified in TS 38.331 [5] and TS 38.213 [6]) is activated. Upon reception of the PDCCH indicating entering dormant BWP, the DL BWP indicated by dormantBWP-Id (as specified in TS 38.331 [5]) is activated. The dormant BWP configuration for SpCell or PUCCH SCell is not supported.

For each activated Serving Cell configured with a BWP, the MAC entity shall:

1> if a BWP is activated and the active DL BWP for the Serving Cell is not the dormant BWP:
2> transmit on UL-SCH on the BWP;
2> transmit on RACH on the BWP, if PRACH occasions are configured;
2> monitor the PDCCH on the BWP;
2> transmit PUCCH on the BWP, if configured;
2> report CSI for the BWP;
2> transmit SRS on the BWP, if configured;
2> receive DL-SCH on the BWP;
2> (re-)initialize any suspended configured uplink grants of configured grant Type 1 on the active BWP according to the stored configuration, if any, and to start in the symbol according to rules in clause 5.8.2;
2> if lbt-FailureRecoveryConfig is configured:
3> stop the lbt-FailureDetectionTimer, if running;
3> set LBT_COUNTER to 0;
3> monitor LBT failure indications from lower layers as specified in clause 5.21.2.

1> if a BWP is activated and the active DL BWP for the Serving Cell is dormant BWP:
2> stop the bwp-InactivityTimer of this Serving Cell, if running.
2> not monitor the PDCCH on the BWP;
2> not monitor the PDCCH for the BWP;
2> not receive DL-SCH on the BWP;
2> not report CSI on the BWP, report CSI except aperiodic CSI for the BWP;
2> not transmit SRS on the BWP;
2> not transmit on UL-SCH on the BWP;
2> not transmit on RACH on the BWP;
2> not transmit PUCCH on the BWP.
2> clear any configured downlink assignment and any configured uplink grant Type 2 associated with the SCell respectively;
2> suspend any configured uplink grant Type 1 associated with the SCell;
2> if configured, perform beam failure detection and beam failure recovery for the SCell if beam failure is detected.

1> if a BWP is deactivated:
2> not transmit on UL-SCH on the BWP;
2> not transmit on RACH on the BWP;
2> not monitor the PDCCH on the BWP;
2> not transmit PUCCH on the BWP;
2> not report CSI for the BWP;
2> not transmit SRS on the BWP;
2> not receive DL-SCH on the BWP;
2> clear any configured downlink assignment and configured uplink grant of configured grant Type 2 on the BWP;
2> suspend any configured uplink grant of configured grant Type 1 on the inactive BWP.

Upon initiation of the Random Access procedure on a Serving Cell, after the selection of carrier for performing Random Access procedure as specified in clause 5.1.1, the MAC entity shall for the selected carrier of this Serving Cell:

1> if PRACH occasions are not configured for the active UL BWP:
2> switch the active UL BWP to BWP indicated by initialUplinkBWP;
2> if the Serving Cell is an SpCell:
3> switch the active DL BWP to BWP indicated by initialDownlinkBWP.

1> else:
   2> if the Serving Cell is an SpCell:
      3> if the active DL BWP does not have the same bwp-Id as the active UL BWP:
         4> switch the active DL BWP to the DL BWP with the same bwp-Id as the active UL BWP.
1> stop the bwp-InactivityTimer associated with the active DL BWP of this Serving Cell, if running.
1> if the Serving Cell is SCell:
   2> stop the bwp-InactivityTimer associated with the active DL BWP of SpCell, if running.
1> perform the Random Access procedure on the active DL BWP of SpCell and active UL BWP of this Serving Cell.

If the MAC entity receives a PDCCH for BWP switching of a Serving Cell, the MAC entity shall:
1> if there is no ongoing Random Access procedure associated with this Serving Cell; or
1> if the ongoing Random Access procedure associated with this Serving Cell is successfully completed upon reception of this PDCCH addressed to C-RNTI (as specified in clauses 5.1.4, 5.1.4a, and 5.1.5):
   2> cancel, if any, triggered consistent LBT failure for this Serving Cell;
   2> perform BWP switching to a BWP indicated by the PDCCH.

If the MAC entity receives a PDCCH for BWP switching for a Serving Cell(s) or a dormancy SCell group(s) while a Random Access procedure associated with that Serving Cell is ongoing in the MAC entity, it is up to UE implementation whether to switch BWP or ignore the PDCCH for BWP switching, except for the PDCCH reception for BWP switching addressed to the C-RNTI for successful Random Access procedure completion (as specified in clauses 5.1.4, 5.1.4a, and 5.1.5) in which case the UE shall perform BWP switching to a BWP indicated by the PDCCH. Upon reception of the PDCCH for BWP switching other than successful contention resolution, if the MAC entity decides to perform BWP switching, the MAC entity shall stop the ongoing Random Access procedure and initiate a Random Access procedure after performing the BWP switching; if the MAC decides to ignore the PDCCH for BWP switching, the MAC entity shall continue with the ongoing Random Access procedure on the Serving Cell. Upon reception of RRC (re-)configuration for BWP switching for a Serving Cell while a Random Access procedure associated with that Serving Cell is ongoing in the MAC entity, the MAC entity shall stop the ongoing Random Access procedure and initiate a Random Access procedure after performing the BWP switching.

Upon reception of RRC (re-)configuration for BWP switching for a Serving Cell, cancel any triggered LBT failure in this Serving Cell.

The MAC entity shall for each activated Serving Cell configured with bwp-InactivityTimer:
1> if the defaultDownlinkBWP-Id is configured, and the active DL BWP is not the BWP indicated by the defaultDownlinkBWP-Id, and the active DL BWP is not the BWP indicated by the dormantBWP-Id if configured; or
1> if the defaultDownlinkBWP-Id is not configured, and the active DL BWP is not the initialDownlinkBWP, and the active DL BWP is not the BWP indicated by the dormantBWP-Id if configured:
   2> if a PDCCH addressed to C-RNTI or CS-RNTI indicating downlink assignment or uplink grant is received on the active BWP; or
   2> if a PDCCH addressed to C-RNTI or CS-RNTI indicating downlink assignment or uplink grant is received for the active BWP; or
   2> if a MAC PDU is transmitted in a configured uplink grant and LBT failure indication is not received from lower layers; or
   2> if a MAC PDU is received in a configured downlink assignment:
      3> if there is no ongoing Random Access procedure associated with this Serving Cell; or
      3> if the ongoing Random Access procedure associated with this Serving Cell is successfully completed upon reception of this PDCCH addressed to C-RNTI (as specified in clauses 5.1.4, 5.1.4a and 5.1.5):
         4> start or restart the bwp-InactivityTimer associated with the active DL BWP.
   2> if the bwp-InactivityTimer associated with the active DL BWP expires:
      3> if the defaultDownlinkBWP-Id is configured:
         4> perform BWP switching to a BWP indicated by the defaultDownlinkBWP-Id.
      3> else:
         4> perform BWP switching to the initialDownlinkBWP.

NOTE: If a Random Access procedure is initiated on an SCell, both this SCell and the SpCell are associated with this Random Access procedure.

1> if a PDCCH for BWP switching is received, and the MAC entity switches the active DL BWP:
   2> if the defaultDownlinkBWP-Id is configured, and the MAC entity switches to the DL BWP which is not indicated by the defaultDownlinkBWP-Id and is not indicated by the dormantBWP-Id if configured; or
   2> if the defaultDownlinkBWP-Id is not configured, and the MAC entity switches to the DL BWP which is not the initialDownlinkBWP and is not indicated by the dormantBWP-Id if configured:
      3> start or restart the bwp-InactivityTimer associated with the active DL BWP.

\*\*\*\*\*\*\*\*\*\*\*\*\*\*\*\*\*\*\*\*\*\*\*\*\*\*\*\*\*\*\*\*\*\*\*\*\*\* Next Quotation [2]
\*\*\*\*\*\*\*\*\*\*\*\*\*\*\*\*\*\*\*\*\*\*\*\*\*\*\*\*\*\*\*\*\*\*\*\*\*\*

5.19 Data inactivity monitoring

The UE may be configured by RRC with a Data inactivity monitoring functionality, when in RRC_CONNECTED. RRC controls Data inactivity operation by configuring the timer dataInactivityTimer.

When dataInactivityTimer is configured, the UE shall:
1> if any MAC entity receives a MAC SDU for DTCH logical channel, DCCH logical channel, or CCCH logical channel; or
1> if any MAC entity transmits a MAC SDU for DTCH logical channel, or DCCH logical channel:
   2> start or restart dataInactivityTimer.
1> if the dataInactivityTimer expires:
   2> indicate the expiry of the dataInactivityTimer to upper layers.

\*\*\*\*\*\*\*\*\*\*\*\*\*\*\*\*\*\*\*\*\*\*\*\*\*\*\*\*\*\*\*\*\*\*\*\*\*\* Next Quotation [2]
\*\*\*\*\*\*\*\*\*\*\*\*\*\*\*\*\*\*\*\*\*\*\*\*\*\*\*\*\*\*\*\*\*\*\*\*\*\*

7.1 RNTI Values
RNTI values are presented in Table 7.1-1.

TABLE 7.1-1

RNTI values.

| Value (hexa-decimal) | RNTI |
|---|---|
| 0000 | N/A |
| 0001-FFF2 | RA-RNTI, MSGB-RNTI, Temporary C-RNTI, C-RNTI, CI-RNTI, MCS-C-RNTI, CS-RNTI, TPC-PUCCH-RNTI, TPC-PUSCH-RNTI, TPC-SRS-RNTI, INT-RNTI, SFI-RNTI, SP-CSI-RNTI, PS-RNTI, SL-RNTI, SLCS-RNTI SL Semi-Persistent Scheduling V-RNTI, and AI-RNTI |
| FFF3-FFFD | Reserved |
| FFFE | P-RNTI |
| FFFF | SI-RNTI |

TABLE 7.1-2

RNTI usage.

| RNTI | Usage | Transport Channel | Logical Channel |
|---|---|---|---|
| P-RNTI | Paging and System Information change notification | PCH | PCCH |
| SI-RNTI | Broadcast of System Information | DL-SCH | BCCH |
| RA-RNTI | Random Access Response | DL-SCH | N/A |
| MSGB-RNTI | Random Access Response for 2-step RA type | DL-SCH | CCCH, DCCH |
| Temporary C-RNTI | Contention Resolution (when no valid C-RNTI is available) | DL-SCH | CCCH, DCCH |
| Temporary C-RNTI | Msg3 transmission | UL-SCH | CCCH, DCCH, DTCH |
| C-RNTI, MCS-C-RNTI | Dynamically scheduled unicast transmission | UL-SCH | DCCH, DTCH |
| C-RNTI | Dynamically scheduled unicast transmission | DL-SCH | CCCH, DCCH, DTCH |
| MCS-C-RNTI | Dynamically scheduled unicast transmission | DL-SCH | DCCH, DTCH |
| C-RNTI | Triggering of PDCCH ordered random access | N/A | N/A |
| CS-RNTI | Configured scheduled unicast transmission (activation, reactivation and retransmission) | DL-SCH, UL-SCH | DCCH, DTCH |
| CS-RNTI | Configured scheduled unicast transmission (deactivation) | N/A | N/A |
| TPC-PUCCH-RNTI | PUCCH power control | N/A | N/A |
| TPC-PUSCH-RNTI | PUSCH power control | N/A | N/A |
| TPC-SRS-RNTI | SRS trigger and power control | N/A | N/A |
| INT-RNTI | Indication pre-emption in DL | N/A | N/A |
| SFI-RNTI | Slot Format Indication on the given cell | N/A | N/A |
| SP-CSI-RNTI | Activation of Semi-persistent CSI reporting on PUSCH | N/A | N/A |
| CI-RNTI | Cancellation indication in UL | N/A | N/A |
| PS-RNTI | DCP to indicate whether to start drx-onDurationTimer for associated DRX cycle | N/A | N/A |
| SL-RNTI | Dynamically scheduled sidelink transmission | SL-SCH | SCCH, STCH |
| SLCS-RNTI | Configured scheduled sidelink transmission (activation, reactivation and retransmission) | SL-SCH | SCCH, STCH |
| SLCS-RNTI | Configured scheduled sidelink transmission (deactivation) | N/A | N/A |
| SL Semi-Persistent Scheduling V-RNTI (NOTE 2) | Semi-Persistently scheduled sidelink transmission for V2X sidelink communication (activation, reactivation and retransmission) | SL-SCH | STCH |

TABLE 7.1-2-continued

RNTI usage.

| RNTI | Usage | Transport Channel | Logical Channel |
| --- | --- | --- | --- |
| SL Semi-Persistent Scheduling V-RNTI (NOTE 2) | Semi-Persistently scheduled sidelink transmission for V2X sidelink communication (deactivation) | N/A | N/A |
| AI-RNTI | Availability indication on the given cell | N/A | N/A |

NOTE 1:
The usage of MCS-C-RNTI is equivalent to that of C-RNTI in MAC procedures (except for the C-RNTI MAC CE).
NOTE 2:
The MAC entity uses SL Semi-Persistent Scheduling V-RNTI to control semi-persistently scheduled sidelink transmission on SL-SCH for V2X sidelink communication as specified in clause 5.14.1.1 of TS 36.321 [22].

Figure 7:
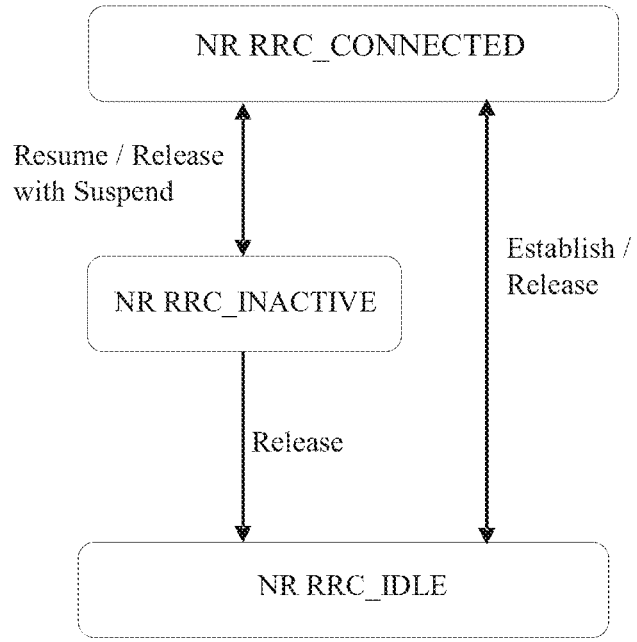
FIG. 7 is a reproduction of Figure 4.2.1-1 from 3GPP TS 38.331 V16.3.1, illustrating an overview of UE RRC state machine and state transitions in NR, where a UE has only one RRC at one time.
Figure 8:
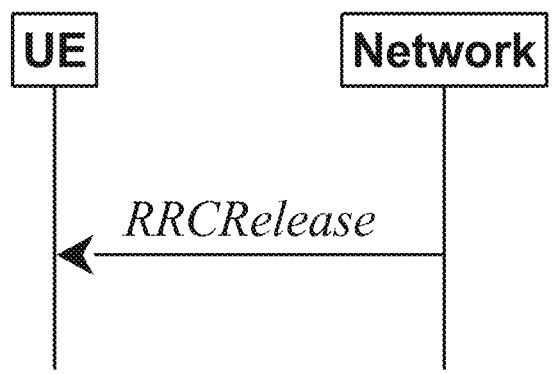
FIG. 8 is a reproduction of Figure 5.3.8.1-1 from 3GPP TS 38.331 V16.3.1, illustrating successful RRC connection release.

**************************************** Quotation End [2]
****************************************
In NR, the descriptions related to UE states and state transition are specified in TS 38.331 [3], and quoted below as a starting point for further enhancement.
**************************************** Quotation Start [3]
****************************************
4.2.1 UE States and State Transitions Including Inter RAT
A UE is either in RRC_CONNECTED state or in RRC_INACTIVE state when an RRC connection has been established. If this is not the case, i.e. no RRC connection is established, the UE is in RRC_IDLE state. The RRC states can further be characterised as follows:
  RRC_IDLE:
    A UE specific DRX may be configured by upper layers;
    UE controlled mobility based on network configuration;
    The UE:
      Monitors Short Messages transmitted with P-RNTI over DCI (see clause 6.5);
      Monitors a Paging channel for CN paging using 5G-S-TMSI;
      Performs neighbouring cell measurements and cell (re-)selection;
      Acquires system information and can send SI request (if configured).
      Performs logging of available measurements together with location and time for logged measurement configured UEs.
  RRC_INACTIVE:
    A UE specific DRX may be configured by upper layers or by RRC layer;
    UE controlled mobility based on network configuration;
    The UE stores the UE Inactive AS context;
    A RAN-based notification area is configured by RRC layer;
    The UE:
      Monitors Short Messages transmitted with P-RNTI over DCI (see clause 6.5);
      Monitors a Paging channel for CN paging using 5G-S-TMSI and RAN paging using full-RNTI;
      Performs neighbouring cell measurements and cell (re-)selection;
      Performs RAN-based notification area updates periodically and when moving outside the configured RAN-based notification area;
      Acquires system information and can send SI request (if configured).
      Performs logging of available measurements together with location and time for logged measurement configured UEs.
  RRC_CONNECTED:
    The UE stores the AS context;
    Transfer of unicast data to/from UE;
    At lower layers, the UE may be configured with a UE specific DRX;
    For UEs supporting CA, use of one or more SCells, aggregated with the SpCell, for increased bandwidth;
    For UEs supporting DC, use of one SCG, aggregated with the MCG, for increased bandwidth;
    Network controlled mobility within NR and to/from E-UTRA;
    The UE:
      Monitors Short Messages transmitted with P-RNTI over DCI (see clause 6.5), if configured;
      Monitors control channels associated with the shared data channel to determine if data is scheduled for it;
      Provides channel quality and feedback information;
      Performs neighbouring cell measurements and measurement reporting;
      Acquires system information;
      Performs immediate MDT measurement together with available location reporting.
FIG. 7 is a reproduction of Figure 4.2.1-1 from 3GPP TS 38.331 V16.3.1, illustrating an overview of UE RRC state machine and state transitions in NR, where a UE has only one RRC at one time.
**************************************** Next Quotation [3]
****************************************
5.3.8 RRC connection release
5.3.8.1 General
FIG. 8 is a reproduction of Figure 5.3.8.1-1 from 3GPP TS 38.331 V16.3.1, illustrating successful RRC connection release.
The purpose of this procedure is:
  to release the RRC connection, which includes the release of the established radio bearers as well as all radio resources; or
  to suspend the RRC connection only if SRB2 and at least one DRB or, for IAB, SRB2, are setup, which includes the suspension of the established radio bearers.
5.3.8.2 Initiation
The network initiates the RRC connection release procedure to transit a UE in RRC_CONNECTED to RRC_IDLE; or to transit a UE in RRC_CONNECTED to RRC_INACTIVE only if SRB2 and at least one DRB or, for IAB, SRB2, is setup in RRC_CONNECTED; or to transit a UE in RRC_I-

NACTIVE back to RRC_INACTIVE when the UE tries to resume; or to transit a UE in RRC_INACTIVE to RRC_IDLE when the UE tries to resume. The procedure can also be used to release and redirect a UE to another frequency.

5.3.8.3 Reception of the RRCRelease by the UE

The UE shall:
1> delay the following actions defined in this sub-clause 60 ms from the moment the RRCRelease message was received or optionally when lower layers indicate that the receipt of the RRCRelease message has been successfully acknowledged, whichever is earlier;
1> stop timer T380, if running;
1> stop timer T320, if running;
1> if timer T316 is running:
  2> stop timer T316;
  2> clear the information included in VarRLF-Report, if any;
1> stop timer T350, if running;
1> if the AS security is not activated:
  2> ignore any field included in RRCRelease message except waitTime;
  2> perform the actions upon going to RRC_IDLE as specified in 5.3.11 with the release cause 'other' upon which the procedure ends;
1> if the RRCRelease message includes redirectedCarrierinfo indicating redirection to eutra:
  2> if cnType is included:
    3> after the cell selection, indicate the available CN Type(s) and the received cnType to upper layers;
  NOTE 1: Handling the case if the E-UTRA cell selected after the redirection does not support the core network type specified by the cnType, is up to UE implementation.
  2> if voiceFallbackIndication is included:
    3> consider the RRC connection release was for EPS fallback for IMS voice (see TS 23.502 [43]);
1> if the RRCRelease message includes the cellReselectionPriorities:
  2> store the cell reselection priority information provided by the cellReselectionPriorities;
  2> if the t320 is included:
    3> start timer T320, with the timer value set according to the value of t320;
1> else:
  2> apply the cell reselection priority information broadcast in the system information;
1> if deprioritisationReq is included and the UE supports RRC connection release with deprioritisation:
  2> start or restart timer T325 with the timer value set to the depriornisationTimer signalled;
  2> store the deprioritisationReq until T325 expiry;
1> if the RRCRelease includes the measIdleConfig:
  2> if T331 is running:
    3> stop timer T331;
    3> perform the actions as specified in 5.7.8.3;
  2> if the measIdleConfig is set to setup:
    3> store the received measIdleDuration in VarMeasIdleConfig;
    3> start timer T331 with the value set to measIdleDuration;
    3> if the measIdleConfig contains measIdleCarrierListNR:
      4> store the received measIdleCarrierListNR in VarMeasIdleConfig;
    3> if the measIdleConfig contains measIdleCarrierListEUTRA:
      4> store the received measIdleCarrierListEUTRA in VarMeasIdleConfig;
    3> if the measIdleConfig contains validityAreaList:
      4> store the received validityAreaList in VarMeasIdleConfig;
1> if the RRCRelease includes suspendConfig:
  2> apply the received suspendConfig;
  2> remove all the entries within VarConditionalReconfig, if any;
  2> for each measId, if the associated reportConfig has a reportType set to condTriggerConfig:
    3> for the associated reportConfigId:
      4> remove the entry with the matching reportConfigId from the reportConfigList within the VarMeasConfig;
    3> if the associated measObjectId is only associated to a reportConfig with reportType set to condTriggerConfig:
      4> remove the entry with the matching measObjectId from the measObjectList within the VarMeasConfig;
    3> remove the entry with the matching measId from the measIdList within the VarMeasConfig;
  2> reset MAC and release the default MAC Cell Group configuration, if any;
  2> re-establish RLC entities for SRB1;
  2> if the RRCRelease message with suspendConfig was received in response to an RRCResumeRequest or an RRCResumeRequest1:
    3> stop the timer T319 if running;
    3> in the stored UE Inactive AS context:
      4> replace the $K_{gNB}$ and $K_{RRCint}$ keys with the current $K_{gNB}$ and $K_{RRCint}$ keys;
      4> replace the C-RNTI with the temporary C-RNTI in the cell the UE has received the RRCRelease message;
      4> replace the cellIdentity with the cellIdentity of the cell the UE has received the RRCRelease message;
      4> replace the physical cell identity with the physical cell identity of the cell the UE has received the RRCRelease message;
  2> else:
    3> store in the UE Inactive AS Context the current $K_{gNB}$ and $K_{RRCint}$ keys, the ROHC state, the stored QoS flow to DRB mapping rules, the C-RNTI used in the source PCell, the cellIdentity and the physical cell identity of the source PCell, the spCellConfigCommon within ReconfigurationWithSync of the NR PSCell (if configured) and all other parameters configured except for:
      parameters within ReconfigurationWithSync of the PCell;
      parameters within ReconfigurationWithSync of the NR PSCell, if configured;
      parameters within MobilityControlInfoSCG of the E-UTRA PSCell, if configured;
      servingCellConfigCommonSIB;
NOTE 2: NR sidelink communication related configurations and logged measurement configuration are not stored as UE Inactive AS Context, when UE enters RRC_INACTIVE.

2> suspend all SRB(s) and DRB(s), except SRB0;
2> indicate PDCP suspend to lower layers of all DRBs;
2> if the t380 is included:
3> start timer T380, with the timer value set to t380;
2> if the RRCRelease message is including the wait-Time:
3> start timer T302 with the value set to the wait-Time;
3> inform upper layers that access barring is applicable for all access categories except categories '0' and '2';
2> if T390 is running:
3> stop timer T390 for all access categories;
3> perform the actions as specified in 5.3.14.4;
2> indicate the suspension of the RRC connection to upper layers;
2> enter RRC_INACTIVE and perform cell selection as specified in TS 38.304 [20];
1> else
2> perform the actions upon going to RRC_IDLE as specified in 5.3.11, with the release cause 'other'.

5.3.8.4 T320 Expiry
The UE shall:
1> if T320 expires:
2> if stored, discard the cell reselection priority information provided by the cellReselectionPriorities or inherited from another RAT;
2> apply the cell reselection priority information broadcast in the system information.

5.3.8.5 UE Actions Upon the Expiry of DataInactivityTimer
Upon receiving the expiry of DataInactivityTimer from lower layers while in RRC_CONNECTED, the UE shall:
1> perform the actions upon going to RRC_IDLE as specified in 5.3.11, with release cause 'RRC connection failure'.

**************************************** Quotation End [3]
****************************************

Agreements from 3GPP meeting RAN2 #111-e about MBS in [5] are quoted below:
**************************************** Quotation Start [5]
****************************************

RAN2 #111-E Agreements
Focus initially on NR SA, TBD to what extent other scenarios NR DC, NE DC can be supported.
Confirm Will support PTM transmission in a cell.
Confirm that We will, for multicast services introduce support for PTP and PTM transmission of shared traffic delivered by 5GC, at least for connected mode (this is not intended to exclude other cases)
For a UE, gNB dynamically decides whether to deliver multicast data by PTM or PTP (Shared delivery)
FFS which layer(s) handles reliability (in general), in order delivery/duplicate handling, and it is FFS how it works at PTM PTP switch.
Focus on MBS-MBS scenario initially (i.e. shared delivery), including both PTM and PTP (if applicable). Other scenarios later, TBD.
Requirements for lossless mobility are TBD. Assume for now that R2 will anyway discuss service continuity functionality for low or no data loss.
R2 assumes that for Rel-17 NR multicast Mobility in Connected mode, handover (including variants) is the baseline, TBD exactly which variants.
R2 expect that there may be HARQ with feedback (for PTM) and this is specified by R1.

**************************************** Quotation End [5]
****************************************

Agreements from 3GPP meeting RAN2 #112-e about MBS in [6] are quoted below:
**************************************** Quotation Start [6]
****************************************

RAN2 #112-e Agreements
Broadcast and Multicast Sessions Support, RRC States and Other Aspects Related to SA2 LS
For Rel-17, R2 specifies two modes:
1: One delivery mode for high QoS (reliability, latency) requirement, to be available in CONNECTED (possibly the UE can switch to other states when there is no data reception TBD)
2: One delivery mode for "low" QoS requirement, where the UE can also receive data in INACTIVE/IDLE (details TBD).
R2 assumes (for R17) that delivery mode 1 is used only for multicast sessions.
R2 assumes that delivery mode 2 is used for broadcast sessions.
The applicability of delivery mode 2 to multicast sessions is FFS.
No data: When there is no data ongoing for the multicast session, the UE can stay in RRC_CONNECTED. Other cases FFS
It is up to SA2 to decide whether the multicast session activation/deactivation mechanism is supported or not, and RAN2 will discuss if there is any RAN2 impacts based on SA2 inputs.
It is up to SA2 to decide on the support of local MBS service, and RAN2 will discuss the RAN2 impacts based on SA2 inputs.
In general, Information of MBS services/groups subscribed by the UE (e.g., TMGI) and QOS requirements of a MBS service should be provided to RAN. Detail information e.g., for PTM PTP switch if any is FFS.
Layer 2 Architecture
The function of mapping from QoS flows to MBS RBs in SDAP is needed for NR MBS. TBD whether any SDAP header is needed.
(Working assumption) no SDAP functions other than "mapping from QoS flows to radio bearers" and "transfer of user plane data" are supported for MBS. FFS whether to support QoS flows to radio bearers remapping.
In general: RAN2 wait for SA3's progress for discussing security issues. TBD whether we need to send LS to SA3.
RoHC (at least U-mode) can be configured for NR MBS bearers. This is applicable for Mcast, assume this is applicable also to broadcast.
RoHC is located at PDCP.
The reordering and in-order delivery function in PDCP is supported for NR MBS.
The following PDCP functions are also supported for NR MBS: transfer of data; maintenance of PDCP SNs; duplicate discarding. Other PDCP functions are FFS.
RLC AM is supported for PTP transmission of NR MBS.
RLC UM is supported for PTP transmission of NR MBS.
RLC UM is supported for PTM transmission of NR MBS.
RLC TM is not supported for PTP transmission of NR MBS.

RLC TM is not supported for PTM transmission of NR MBS.

FFS for PTM if multiplexing/de-multiplexing of different logical channels are to be supported in MAC for NR MBS.

Working assumption: RLC-AM for PTM is not supported (can be revisited but it means that proponents of RLC-AM for PTM need to demonstrate the need, to change this).

Service Continuity

R2 aim to support lossless handover for MBS-MBS mobility for service that requires this (TBD which detailed scenario but at least PTP-PTP)

In order to support the lossless handover for 5G MBS services, at least DL PDCP SN synchronization and continuity between the source cell and the target cell should be guaranteed by the network side to realize. The design of specific approach to realize this can be involved with WG RAN3.

From network side, the source gNB may forward the data to the target gNB and the target gNB will deliver the forwarding data. Meanwhile, the SN STATUS TRANSFER should be extended to cover the PDCP SN for MBS data; Then (TBD after or in parallel) the UE receives the MBS in the target cell by the target cell according to target configuration.

From UE side, PDCP status report may be supported as well.

Idle/Inactive Support

UE receives the MBS configuration (for broadcast/delivery mode 2) by BCCH and/or MCCH (TBD), and this can be received in Idle/Inactive mode. Connected mode FFS (dep on UE cap and where service is provided etc). A notification mechanism is used to announce the change of MBS Control information.

************************************** Quotation End [6]
**************************************

Agreements from 3GPP meeting RAN1 #102-e about MBS in [7] are quoted below:
************************************** Quotation Start [7]
**************************************

Agreements:

For RRC_CONNECTED UEs, HARQ-ACK feedback is supported for multicast and no additional evaluation is needed to justify this.

FFS: The detailed HARQ-ACK feedback solutions, e.g., ACK/NACK based, NACK-only based.

FFS: HARQ-ACK feedback can be optionally disabled and/or enabled.

Agreements:

For RRC_CONNECTED UEs, at least support group-common PDCCH with CRC scrambled by a common RNTI to schedule a group-common PDSCH, where the scrambling of the group-common PDSCH is based on the same common RNTI.

FFS: whether to support UE-specific PDCCH to schedule a PDSCH for MBS.

Agreements:

For RRC_CONNECTED UEs, define/configure common frequency resource for group-common PDSCH.

FFS: whether to reuse the BWP framework or not

FFS: the relation between the common frequency resource and UE dedicated BWP, e.g., the common frequency resource is a MBS specific BWP, or the common frequency resource is confined within UE's dedicated BWP, etc.

FFS: whether more than one common frequency resource can be configured per UE

Agreements:

For RRC_CONNECTED UEs, at least support FDM between unicast PDSCH and group-common PDSCH in a slot based on UE capability.

FFS: TDM or SDM in a slot.

Agreements:

For RRC_CONNECTED UEs, at least support slot-level repetition for group-common PDSCH.

FFS: whether enhancement is needed

Agreements:

For RRC_CONNECTED UEs, existing CSI feedback can be used for multicast transmission.

FFS: whether enhancement is needed

************************************** Quotation End [7]
**************************************

Agreements and Working Assumptions from 3GPP meeting RAN1 #103-e about MBS in [8] are quoted below:
************************************** Quotation Start [8]
**************************************

Agreements: For convenience of discussion, consider the following clarification as RAN1 common understanding.

PTP transmission: For RRC_CONNECTED UEs, use UE-specific PDCCH with CRC scrambled by UE-specific RNTI (e.g., C-RNTI) to schedule UE-specific PDSCH which is scrambled with the same UE-specific RNTI.

PTM transmission scheme 1: For RRC_CONNECTED UEs in the same MBS group, use group-common PDCCH with CRC scrambled by group-common RNTI to schedule group-common PDSCH which is scrambled with the same group-common RNTI. This scheme can also be called group-common PDCCH based group scheduling scheme.

PTM transmission scheme 2: For RRC_CONNECTED UEs in the same MBS group, use UE-specific PDCCH with CRC scrambled by UE-specific RNTI (e.g., C-RNTI) to schedule group-common PDSCH which is scrambled with group-common RNTI. This scheme can also be called UE-specific PDCCH based group scheduling scheme.

Note: The 'UE-specific PDCCH/PDSCH' here means the PDCCH/PDSCH can only be identified by the target UE but cannot be identified by the other UEs in the same MBS group with the target UE.

Note: The 'group-common PDCCH/PDSCH' here means the PDCCH/PDSCH are transmitted in the same time/frequency resources and can be identified by all the UEs in the same MBS group.

FFS whether or not to have additional definition of transmission scheme(s)

Agreements: For RRC_CONNECTED UEs, if initial transmission for multicast is based on PTM transmission scheme 1, at least support retransmission(s) can use PTM transmission scheme 1.

FFS: whether to support PTP transmission for retransmission(s).

FFS: whether to support PTM transmission scheme 2 for retransmission(s).

FFS: How to indicate the association between PTM scheme 1 and PTP transmitting the same TB.

FFS: If multiple retransmission schemes are supported, then can different retransmission schemes be supported simultaneously for different UEs in the same group?

Working Assumption:

For multicast of RRC-CONNECTED UEs, a common frequency resource for group-common PDCCH/PDSCH is confined within the frequency resource of a dedicated unicast BWP to support simultaneous reception of unicast and multicast in the same slot Down select from the two options for the common frequency resource for group-common PDCCH/PDSCH Option 2A: The common frequency resource is defined as an MBS specific BWP, which is associated with the dedicated unicast BWP and using the same numerology (SCS and CP)

FFS BWP switching is needed between the multicast reception in the MBS specific BWP and unicast reception in its associated dedicated BWP Option 2B: The common frequency resource is defined as an 'MBS frequency region' with a number of contiguous PRBs, which is configured within the dedicated unicast BWP.

FFS: How to indicate the starting PRB and the length of PRBs of the MBS frequency region FFS whether UE can be configured with no unicast reception in the common frequency resource FFS on details of the group-common PDCCH/PDSCH configuration FFS whether to support more than one common frequency resources per UE/per dedicated unicast BWP subjected to UE capabilities Agreement: Support TDM between one unicast PDSCH and one group-common PDSCH in a slot based on UE capability for RRC_CONNECTED UEs.

Agreements: Support SPS group-common PDSCH for MBS for RRC_CONNECTED UEs

FFS: use group-common PDCCH or UE-specific PDCCH for SPS group-common PDSCH activation/deactivation FFS: whether to support more than one SPS group-common PDSCH configuration per UE FFS: whether and how uplink feedback could be configured FFS: retransmission of SPS group-common PDSCH Agreements: For PTM transmission scheme 1, the CORESET for group-common PDCCH is configured within the common frequency resource for group-common PDSCH.

FFS: number of CORESET(s) for group-common PDCCH within the common frequency resource for group-common PDSCH Agreement: For search space set of group-common PDCCH of PTM scheme 1 for multicast in RRC_CONNECTED state, the CCE indexes are common for different UEs in the same MBS group.

Agreements: Down select from the two options for BDs/CCEs limit for Rel-17 MBS

Option 1: the maximum number of monitored PDCCH candidates and non-overlapped CCEs per slot per serving cell defined in Rel-15 is kept unchanged for Rel-17 MBS.

Option 2: For UEs supporting CA capability, the budget of BDs/CCEs of an unused CC can be used for group-common PDCCH to count the number of BDs/CCEs, which is similar to the method used for multi-DCI based multi-TRP in Rel-16.

Agreement: For RRC_CONNECTED UEs, support inter-slot TDM between unicast PDSCH and group-common PDSCH in different slots (mandatory for the UE supporting MBS).

Agreements: Further study the following cases for simultaneous reception of unicast PDSCH and group-common PDSCH in a slot based on UE capability for RRC_CONNECTED UEs.

Case 1: support TDM between multiple TDMed unicast PDSCHs and one group-common PDSCH in a slot Case 2: support TDM among multiple group-common PDSCHs in a slot Case 3: support TDM between multiple TDMed unicast PDSCHs and multiple TDMed group-common PDSCHs in a slot Case 4: support FDM between multiple TDMed unicast PDSCHs and multiple TDMed group-common PDSCHs in a slot Case 5: support FDM among multiple group-common PDSCHs in a slot FFS: maximum number of PDSCHs in a slot simultaneous received per UE Agreements: For search space set of group-common PDCCH of PTM scheme 1 for multicast in RRC_CONNECTED state, further study the following options.

Option 1: Define a new search space type specific for multicast

Option 2: Reuse the existing CSS type(s) in Rel-15/16

FFS: whether modifications are needed for multicast

Option 3: Reuse the existing USS in Rel-15/16 with necessary modifications for MBS FFS: detailed modifications Agreement: No specification enhancement in Rel-17 to support SDM between unicast PDSCH and group-common PDSCH in a slot for RRC_CONNECTED UEs.

Agreement: For PTM transmission scheme 1, if Option 2A or Option 2B for common frequency resource for group-common PDCCH/PDSCH is agreed, the FDRA field of group-common PDCCH is interpreted based on the common frequency resource.

Agreements: For search space set of group-common PDCCH of PTM scheme 1 for multicast in RRC_CONNECTED state, further study the following options for the monitoring priority of search space set Option 1: The monitoring priority of search space set for multicast is the same as existing Rel-15/16 CSS Option 2: The monitoring priority of search space set for multicast is the same as existing Rel-15/16 USS Other options are not precluded The monitoring priority is used at least for PDCCH overbooking case FFS for other cases (e.g., to prune PDCCH in terms of whether it's unicast or multicast, etc.)

Agreements:

For RRC_CONNECTED UEs receiving multicast, at least for PTM scheme 1, support at least one of the following:

ACK/NACK based HARQ-ACK feedback for multicast,

From per UE perspective, UE feedback ACK or NACK.

From UEs within the group perspective,

FFS: PUCCH resource configuration for ACK/NACK feedback e.g., shared or separate PUCCH resources.

FFS details including conditions for it to be used

NACK-only based HARQ-ACK feedback for multicast,
    From per UE perspective, UE only feedback NACK.
    From UEs within the group perspective or NACK only feedback.
    FFS details including conditions for it to be used
To decide in RAN1 #104-e whether or not to support only one or both of the above schemes
    If both are supported, FFS configuration/selection of ACK/NACK-based and NACK-only based HARQ-ACK feedback Agreements:
For RRC_CONNECTED UEs receiving multicast, for ACK/NACK based HARQ-ACK feedback if supported for group-common PDCCH scheduling, PUCCH resource configuration for HARQ-ACK feedback from per UE perspective is, down-select one of the following options:
    Option 1: shared with PUCCH resource configuration for HARQ-ACK feedback for unicast
    Option 2: separate from PUCCH resource configuration for HARQ-ACK feedback for unicast
    Option 3: Option 1 or option 2 based on configuration Agreements:
For RRC_CONNECTED UEs receiving multicast, for NACK-only based HARQ-ACK feedback if supported for group-common PDCCH scheduling, PUCCH resource configuration for HARQ-ACK feedback from per UE perspective is separate from PUCCH resource configuration for HARQ-ACK feedback for unicast.
    FFS PUCCH format Agreements:
Enabling/disabling HARQ-ACK feedback for MBS is supported, further down-select between:
    Option 1: DCI
    Option 2: RRC configures enabling/disabling
    Option 3: RRC configures the enabling/disabling function and DCI indicates enabling/disabling
    FFS: Option 4: MAC-CE indicates enabling/disabling
    FFS: Option 5: RRC configures the enabling/disabling function and MAC-CE indicates enabling/disabling Agreements:
For slot-level repetition for group-common PDSCH of RRC_CONNECTED UEs, for indicating the repetition number, further down-select among:
    Opt 1: by DCI
    Opt 2: by RRC
    Opt 3: by RRC+DCI
    FFS: Opt 4: by MAC-CE
    FFS: Opt 5: by RRC+MAC-CE
    FFS details for each option.
    FFS further enhancements for configuration of slot-level repetition Agreements:
From the perspective of RRC_CONNECTED UEs receiving multicast, at least for PTM scheme 1 initial transmission, retransmission supports, for the purpose of down-selection, options are:
    Option 1: group-common PDCCH scheduled group-common PDSCH
    Option 2: UE-specific PDCCH scheduled PDSCH
        Alt 1: PDSCH is UE-specific PDSCH
        Alt 2: PDSCH is group-common PDSCH
    Option 3: both option 1 and option 2
    FFS other options
    FFS CBG based retransmission Agreements:
FFS whether CSI feedback enhancement is needed for MBS, including but not limited:
    New CQI measurement
    New CSI report formats
    Targeted BLER
    CSI-RS configuration
    A-CSI-RS transmission triggering
    SRS configuration Agreements:
For ACK/NACK based HARQ-ACK feedback if supported, both Type-1 and Type-2 HARQ-ACK codebook are supported for RRC_CONNECTED UEs receiving multicast,
    FFS details of HARQ-ACK codebook design.
    FFS whether enhanced Type-2 and/or Type-3 HARQ-ACK codebook is supported or not.

Agreements: For RRC_IDLE/RRC_INACTIVE UEs, support group-common PDCCH with CRC scrambled by a common RNTI to schedule a group-common PDSCH, where the scrambling of the group-common PDSCH is based on the same common RNTI.
    FFS details Agreements:
    For RRC_IDLE/RRC_INACTIVE Ues, beam sweeping is supported for group-common PDCCH/PDSCH.
        FFS: Details for support of beam sweeping for group-common PDCCH/PDSCH.

Agreements: For RRC_IDLE/RRC_INACTIVE UEs, define/configure common frequency resource(s) for group-common PDCCH/PDSCH.
    the UE may assume the initial BWP as the default common frequency resource for group-common PDCCH/PDSCH, if a specific common frequency resource is not configured.
    FFS: the relation of the common frequency resource(s) (if configured) and initial BWP.
    FFS: whether to configure one/more common frequency resources
    FFS: configuration and definition details of the common frequency resource Agreements: From physical layer perspective, for broadcast reception, the same group-common PDCCH and the corresponding scheduled group-common PDSCH can be received by both RRC_IDLE/RRC_INACTIVE UEs and RRC_CONNECTED UEs.
    FFS details.

Agreements: For RRC_IDLE/RRC_INACTIVE UEs, CSS is supported for group-common PDCCH.
    FFS: reuse current CSS type, define a new CSS type, etc.
    FFS other details.

Agreements: For RRC_IDLE/RRC_INACTIVE UEs, a CORESET can be configured within the common frequency resource for group-common PDCCH/PDSCH. CORESET0 is used by default if the common frequency resource for group-common PDCCH/PDSCH is the initial BWP and the CORESET is not configured.

FFS: configuration details of the CORESET for group-common PDCCH/PDSCH

\*\*\*\*\*\*\*\*\*\*\*\*\*\*\*\*\*\*\*\*\*\*\*\*\*\*\*\*\*\*\*\*\*\*\*\*\*\* Quotation End [8]
\*\*\*\*\*\*\*\*\*\*\*\*\*\*\*\*\*\*\*\*\*\*\*\*\*\*\*\*\*\*\*\*\*\*\*\*\*\*

The descriptions for introducing the enhancements specified on support of MBS in NR[9] are quoted below:
\*\*\*\*\*\*\*\*\*\*\*\*\*\*\*\*\*\*\*\*\*\*\*\*\*\*\*\*\*\*\*\*\*\*\*\*\*\* Quotation Start [9]
\*\*\*\*\*\*\*\*\*\*\*\*\*\*\*\*\*\*\*\*\*\*\*\*\*\*\*\*\*\*\*\*\*\*\*\*\*\*

16.x MBS 16.x.1 General

Editor's Note: General aspects to be covered here.

MBS session is defined as a multicast session or a broadcast session. A broadcast session is to deliver the broadcast communication service and a multicast session is to deliver the multicast communication service, where the broadcast communication service is a communication service in which the same service and the same specific content data are provided simultaneously to all UEs in a geographical area and the multicast communication service is a kind of service in which the same service and the same specific content data are provided simultaneously to a dedicated set of UEs, as specified in TS 23.XXX [xx].

For the transmission of MBS service, the cases can be categorized as follows:

In case of multicast session with QoS requirement of high reliability and/or low latency, the UE can receive MBS data in RRC_CONNECTED with mechanisms to guarantee required QoS requirement, e.g., feedback/retransmission and/or PTP assistance, if needed.

In case of the transmission of broadcast session with QoS requirement of low reliability and/or latency-tolerant, the UE can receive MBS data in RRC_IDLE/RRC_INACTIVE/RRC_CONNECTED and PTP assistance for reliability guarantee is not needed.

\*\*\*\*\*\*\*\*\*\*\*\*\*\*\*\*\*\*\*\*\*\*\*\*\*\*\*\*\*\*\*\*\*\*\*\*\*\* Quotation End [9]
\*\*\*\*\*\*\*\*\*\*\*\*\*\*\*\*\*\*\*\*\*\*\*\*\*\*\*\*\*\*\*\*\*\*\*\*\*\*

Issue and Solution 1:

Currently, in NR Rel-15/16, if a specific group of UEs demand the same data/service from the network at (about) the same time, e.g., a specific group of UEs demanding live streaming videos/images/data of the same event, the network may use UE-dedicated downlink control information (DCI) for each UE in the specific group to transmit the same/repeated data block, e.g., the same/repeated transport block (TB), on each UE's dedicated radio resource with the dedicated downlink control information and data block for each UE, in the specific group, being scrambled by each UE's unique identity, e.g., C-RNTI. More specifically, the network may transmit a UE-dedicated downlink control information for each UE in the specific group and schedule different PDSCHs carrying the same transport block scrambled by each UE's unique identity for each UE. In this way, the same data block, e.g., the same transport block, may be transmitted many times for each UE in the specific group.

Currently, there is no mechanism for the network to group-schedule a specific group of UEs with a single block of group-common data. In other words, there is no mechanism for the network to transmit a single block of group-common data to the specific group of UEs. When the number of UEs in the specific group that demand the same data/service from the network at (about) the same time becomes large, UE-dedicated transmissions of the downlink control information and the same/repeated data block, e.g., the same/repeated transport block, from the network for each UE in the specific group becomes inefficient because the network may transmit the same data block (transport block) many times for each UE in the specific group and it may waste radio resources and/or transmission power.

In NR Rel-17, the MBS work item is introduced to support the network group-scheduling feature. For a specific group of UEs demanding the same data block (transport block) at (about) the same time, the network may use/transmit a single "group-common (GC)" downlink control information to schedule a single "group-common" data block (transport block) on the group-common resource for the specific group of UEs, where both the "group-common" downlink control information and the "group-common" data block (transport block) are scrambled by a "group-common" RNTI (e.g., a GC-RNTI) that may be configured by higher-layers and may be shared among the UEs in the specific group. Here, for a group of UEs demanding the same data block (transport block) at (about) the same time and monitoring a group-common downlink control information to schedule a group-common data block, each UE in the group is configured with or belongs to a multicast and broadcast service (MBS) group with a group-common identifier (e.g., a GC-RNTI) shared and known to each UE in the MBS group. Preferably, a UE may be configured with one, or more than one, group-common RNTI, which means the UE may belong to one, or more than one, MBS group, where each MBS group may comprise different sets of UEs.

Based on the agreements and working assumptions described above, it is clear that a UE should be in RRC_CONNECTED state to receive a multicast session with a QoS requirement of high reliability and/or low latency. It is also agreed that "When there is no data ongoing for the multicast session, the UE can stay in RRC_CONNECTED". However, it is specified in the NR RRC specification, e.g., TS 38.331 V16.3.1, that a UE shall perform the actions upon going to RRC_IDLE state upon receiving the expiry of dataInactivityTimer from lower layers while in RRC_CONNECTED state.

Until now, the current NR MAC specification, e.g., TS 38.321 V16.3.0, considers only the DTCH logical channel, DCCH logical channel, or CCCH logical channel as the condition of maintaining the "dataInactivityTimer", which is used for controlling UE RRC state transition. The DTCH logical channel, DCCH logical channel, or CCCH logical channel may be used for the MBS service if a PTP transmission scheme is utilized. However, if the UE receives the MBS service through other transmission schemes (e.g., PTM transmission scheme 1), the new radio bear for MBS service (e.g., MRB) may be mapped to new logical channel for MBS traffic channel (e.g., MTCH) and/or MBS control channel (MCCH). In this case, the UE may not start or restart the dataInactivityTimer and the dataInactivityTimer may expire and causes the UE to perform state transition from RRC_CONNECTED to RRC_IDLE. The unintended state transition may cause the UE to fail to receive the multicast session with a QoS requirement of high reliability and/or low latency for a period of time.

In order to solve the issue of the "unintended state transition" described above, one or more of the following concepts, mechanisms, methods, and/or embodiments are provided or implemented. For example, by applying one or more of these proposed methods, the unintended UE state transition is avoided and the risk of packet loss due to the unintended UE state transition is reduced.

Figure 9:
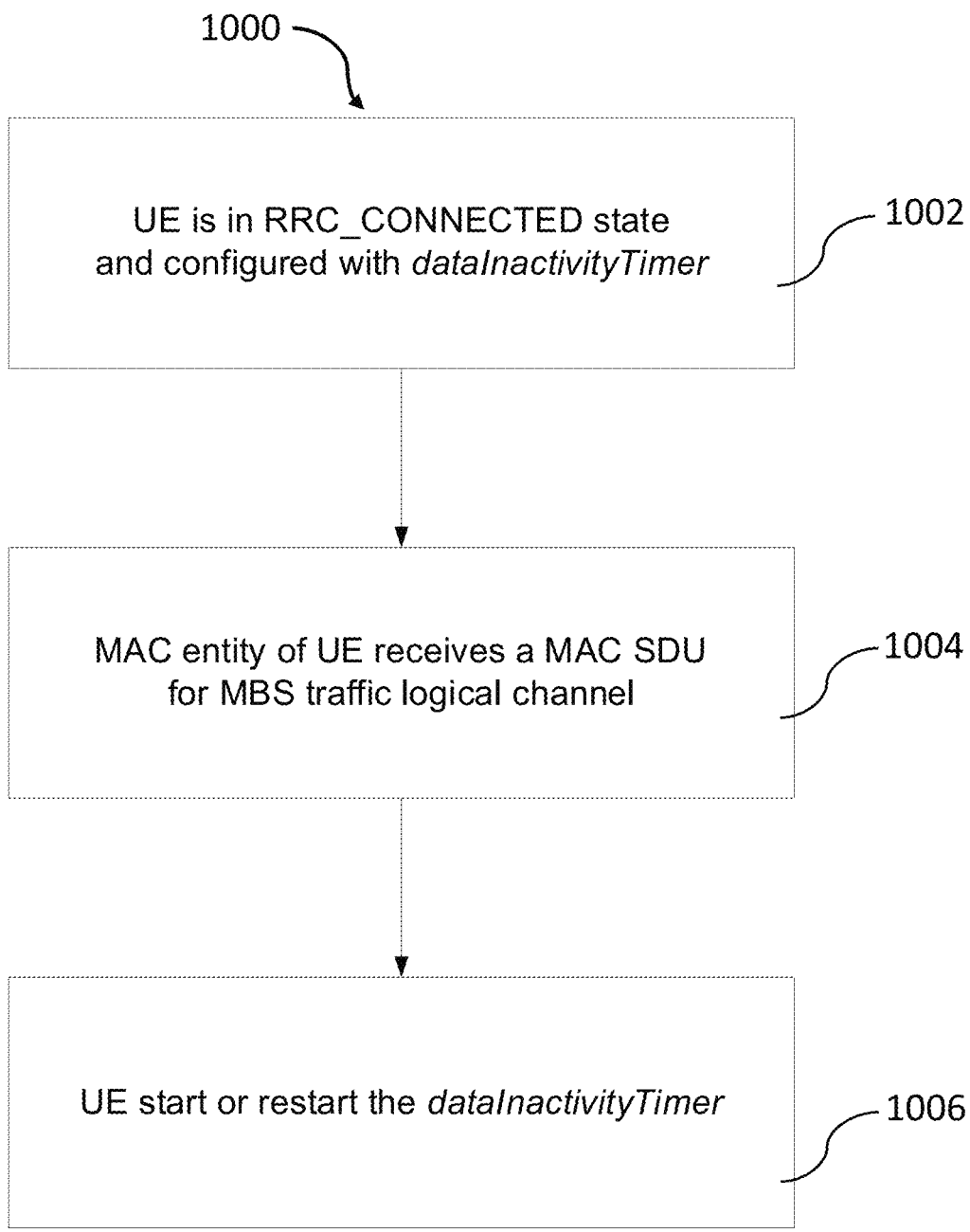
FIG. 9 is a flow diagram showing a method for avoiding unintended UE state transition, with the UE, configured with a dataInactivityTimer, receiving a MAC SDU for a MBS traffic logical channel, and starting or restarting the timer, in accordance with embodiments of the present invention.
Figure 10:
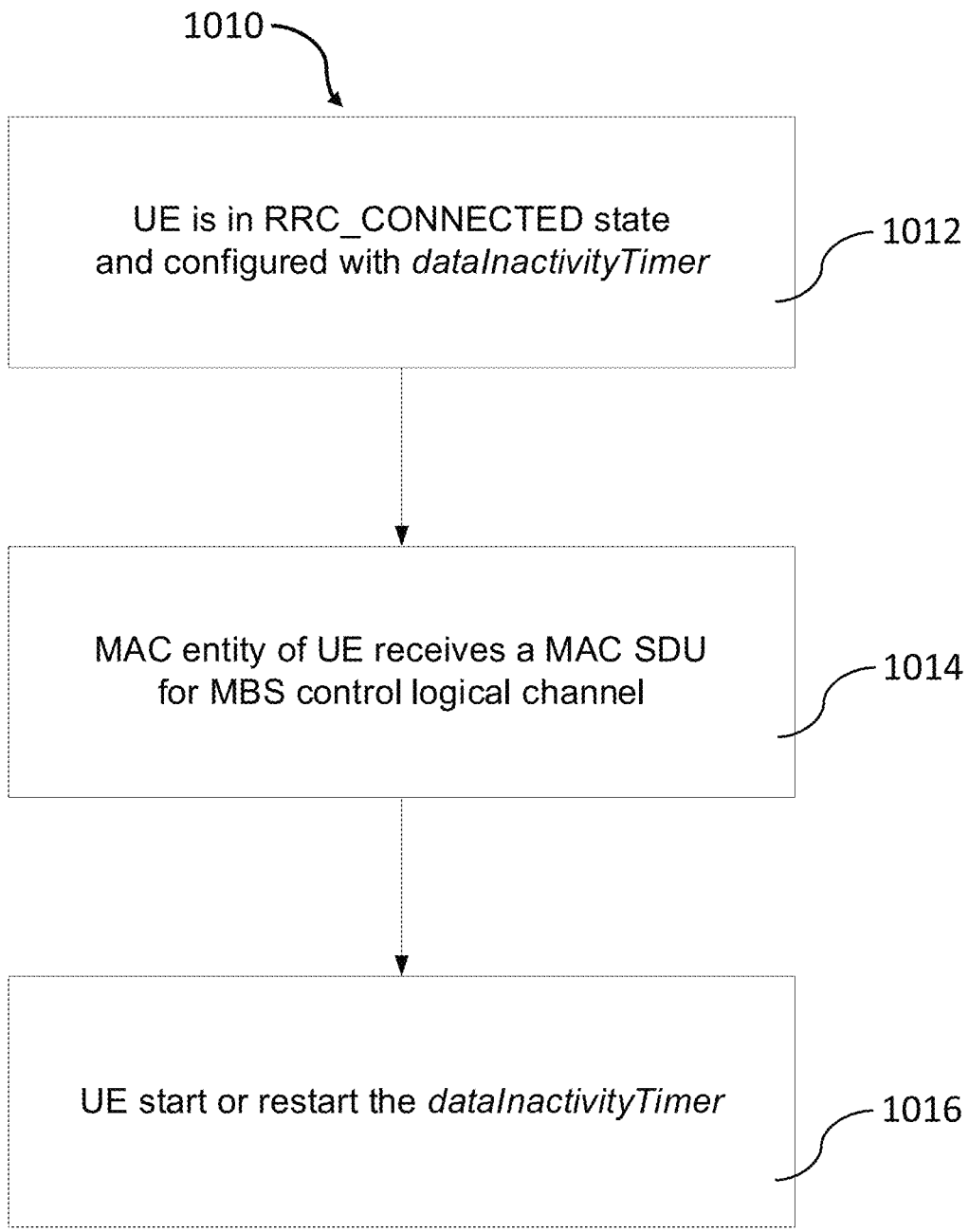
FIG. 10 is a flow diagram showing a method for avoiding unintended UE state transition, with the UE, configured with a dataInactivityTimer, receiving a MAC SDU for a MBS control logical channel, and starting or restarting the timer, in accordance with embodiments of the present invention.

Referring to FIGS. 9-10, a method of the present invention is that in addition to the DTCH logical channel, DCCH logical channel, or CCCH logical channel, the new logical channel for MBS traffic (e.g., MTCH) and/or MBS control (e.g., MCCH) are considered as the condition of maintaining the dataInactivityTimer, which is used for controlling UE RRC state transition.

Embodiments can include a device (e.g., UE) configured by a network node through a signaling with a functionality, wherein the functionality is associated with a timer. The device receives a package, wherein the package contains one or more payload, and the payload is mapped to a logical channel, wherein the logical channel is used for multicast and/or broadcast service, and the device starts or restarts the timer.

For the example process 1000 of FIG. 9, the device is a UE in RRC_CONNECTED state and configured with a dataInactivityTimer at step 1002, A MAC entity of the UE receives a MAC SDU for a MBS traffic logical channel at step 1004, and the UE starts or restarts the dataInactivityTimer at step 1006.

For the example process 1010 of FIG. 10, the device is a UE in RRC_CONNECTED state and configured with a dataInactivityTimer at step 1012, A MAC entity of the UE receives a MAC SDU for a MBS control logical channel at step 1014, and the UE starts or restarts the dataInactivityTimer at step 1016.

In various embodiments, the device is a UE and/or the network node is a gNB.

In various embodiments, the signaling is a RRC message.

In various embodiments, the functionality is about, including, or related to data inactivity monitoring and operation.

In various embodiments, the timer is a data-InactivityTimer, wherein the data-InactivityTimer controls the behavior of RRC state transition if the data-InactivityTimer expires.

In various embodiments, if the data-InactivityTimer expires, the device performs RRC state transition to RRC_IDLE state.

In various embodiments, the package is a medium access control (MAC) protocol data unit (PDU).

In various embodiments, the payload is a MAC service data unit (SDU).

In various embodiments, the logical channel is MBS traffic channel (MTCH) and/or MBS control channel (MCCH).

Referring back to FIGS. 3 and 4, in one or more embodiments, the device 300 includes program code 312 stored in memory 310. The CPU 308 could execute program code 312 to (i) configure the device 300, by a network node, through a signaling with a functionality, wherein the functionality is associated with a timer, (ii) receive a package, at the device 300, wherein the package contains one or more payload, and the payload is mapped to a logical channel, wherein the logical channel is used for multicast and/or broadcast service, and (iii) start or restart the timer at the device 300. Moreover, the CPU 308 can execute the program code 312 to perform all of the described actions, steps, and methods described herein.

Figure 11:
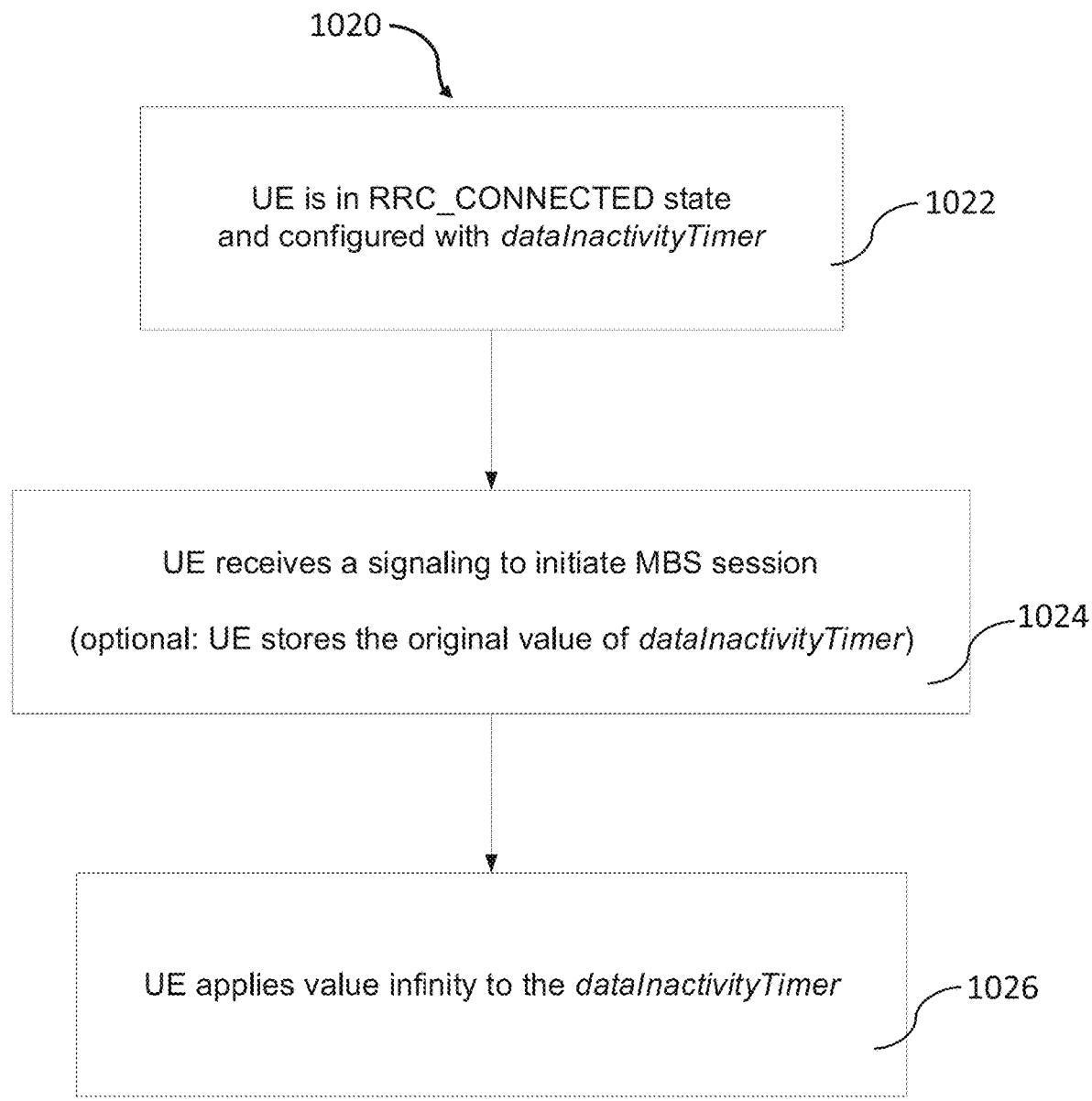
FIG. 11 is a flow diagram showing a method for avoiding unintended UE state transition, with the UE, configured with a dataInactivityTimer, receiving a signaling to initiate a MBS session, and applying the value "infinity" to the timer, in accordance with embodiments of the present invention.

Referring to FIG. 11, another method of the present invention is that the value "infinity" can be applied to the value of the dataInactivityTimer. Preferably, the value "infinity" is applied to the value of the dataInactivityTimer configured by RRC with a Data inactivity monitoring functionality during the process steps of the UE initiating the MBS service.

Embodiments can include a device (e.g., UE) configured by a network node through a first signaling with a functionality, wherein the functionality is associated with a timer. The device is configured by the network node through a second signaling to initiate multicast and/or broadcast service, and the device applies a value "infinity" to the timer.

For the example process 1020 of FIG. 11, the device is a UE in RRC_CONNECTED state and configured with a dataInactivityTime at step 1022, the UE receives a signaling to initiate a MBS session (and/or the UE stores the original value of dataInactivityTimer) at step 1024, and the UE applies the "infinity" value to the dataInactivityTimer at step 1026.

In various embodiments, the device further stores the original value of the timer before applying value "infinity" to the timer.

In various embodiments, the device further is configured by the network node through a third signaling to close multicast and/or broadcast service, and the device restores the original value of the timer to the timer.

In various embodiments, the device further is configured by the network node through a third signaling to close multicast and/or broadcast service, and the device applies the value included in the third signaling to the timer.

In various embodiments, the device is a UE and/or the network node is a gNB.

In various embodiments, the first signaling and/or the second signaling and/or the third signaling is a RRC message.

In various embodiments, the functionality is about, including, or related to data inactivity monitoring and operation.

In various embodiments, the timer is a data-InactivityTimer, wherein the data-InactivityTimer controls the behavior of RRC state transition if the data-InactivityTimer expires.

In various embodiments, if the data-InactivityTimer expires, the device performs RRC state transition to RRC_IDLE state.

Referring back to FIGS. 3 and 4, in one or more embodiments, the device 300 includes program code 312 stored in memory 310. The CPU 308 could execute program code 312 to (i) configure the device 300, by a network node, through a signaling with a functionality, wherein the functionality is associated with a timer, (ii) configure the device 300, by the network node, through a second signaling to initiate multicast and/or broadcast service, and (iii) apply a value "infinity" to the timer. Moreover, the CPU 308 can execute the program code 312 to perform all of the described actions, steps, and methods described herein.

Figure 12:
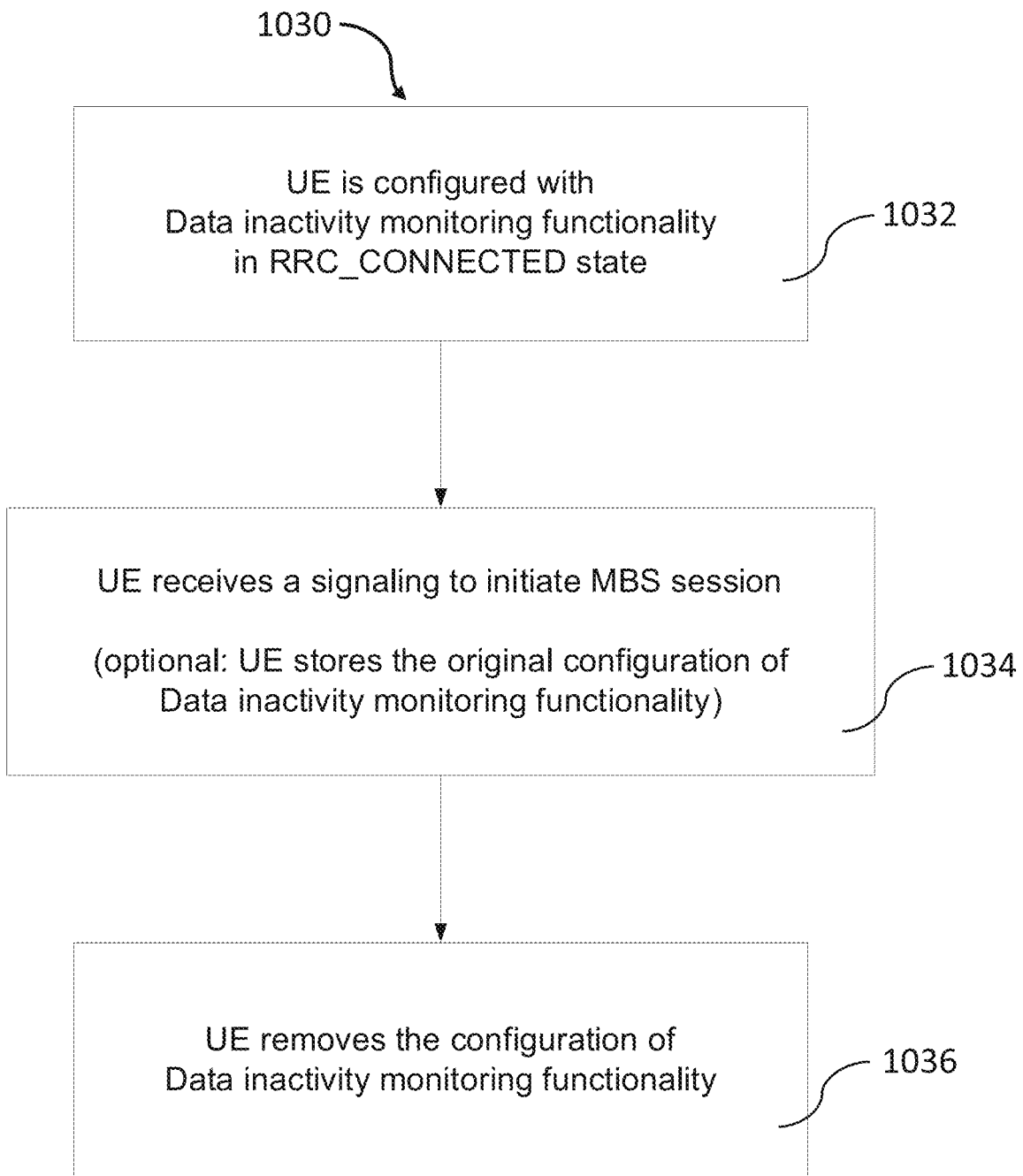
FIG. 12 is a flow diagram showing a method for avoiding unintended UE state transition, with the UE, configured with Data inactivity monitoring, receiving a signaling to initiate a MBS session, and removing the configuration of Data inactivity monitoring functionality, in accordance with embodiments of the present invention.

Referring to FIG. 12, another method of the present invention is that the configuration of the dataInactivityTimer is removed during the UE joining the MBS service. Preferably, the status of the dataInactivityTimer configured by RRC with a Data inactivity monitoring functionality is changed to be "not configured" during the process steps of the UE initiating the MBS service.

Embodiments can include a device (e.g., UE) configured by a network node through a first signaling with a functionality, wherein the functionality is associated with a timer. The device is configured by the network node through a second signaling to initiate multicast and/or broadcast service, and the device removes the configuration of the functionality according to the second signaling.

For the example process 1030 of FIG. 12, the device is a UE configured with Data inactivity monitoring functionality in RRC_CONNECTED state at step 1032, the UE receives a signaling to initiate a MBS session (and/or the UE stores the original configuration of Data inactivity functionality) at step 1034, and the UE removes the configuration of Data inactivity monitoring functionality at step 1036.

In various embodiments, the device further stores the original configuration of the functionality.

In various embodiments, the device further is configured by the network node through a third signaling to close multicast and/or broadcast service, and the device recovers the original configuration of the functionality.

In various embodiments, the device further is configured by the network node through a third signaling to close multicast and/or broadcast service, and the device is configured with the functionality according the third signaling.

In various embodiments, the device is a UE and/or the network node is a gNB.

In various embodiments, the first signaling, and/or the second signaling, and/or the third signaling is a RRC message.

In various embodiments, the functionality is about, including, or related to data inactivity monitoring and operation.

In various embodiments, the timer is a data-Inactivity-Timer, wherein the data-InactivityTimer controls the behavior of RRC state transition if the data-InactivityTimer expires.

In various embodiments, if the data-InactivityTimer expires, the device performs RRC state transition to RRC_IDLE state.

Referring back to FIGS. 3 and 4, in one or more embodiments, the device 300 includes program code 312 stored in memory 310. The CPU 308 could execute program code 312 to (i) configure the device 300, by a network node, through a first signaling with a functionality, wherein the functionality is associated with a timer, (ii) configure the device 300, by the network node, through a second signaling to initiate multicast and/or broadcast service, and (iii) remove the configuration of the functionality according to the second signaling. Moreover, the CPU 308 can execute the program code 312 to perform all of the described actions, steps, and methods described herein.

It is noted that any of the methods, alternatives, steps, examples, and embodiments proposed herein may be applied independently, individually, and/or with multiple methods, alternatives, steps, examples, and embodiments combined together.

Issue and Solution 2:

Based on the agreements and working assumptions described above, it is clear that the frequency resources for MBS service is related to at least one Bandwidth Part (BWP) and UE should know that BWP to receive the MBS service. As an example, for RRC_IDLE/RRC_INACTIVE UEs, the frequency resources for MBS service are related to the initial BWP. As another example, for RRC-CONNECTED UEs, the frequency resources for MBS service are related to a dedicated unicast BWP.

To receive the MBS service, UE needs to know the specific RNTI value to recover the scrambled PDCCH and/or PDSCH. As an example, for RRC_IDLE/RRC_INACTIVE UEs, it is supported that a group-common PDCCH with CRC scrambled by a common RNTI is to schedule a group-common PDSCH, where the scrambling of the group-common PDSCH is based on the same RNTI. As another example, for RRC-CONNECTED UEs in the same MBS group, the "PTM transmission scheme 1" uses group-common PDCCH with CRC scrambled by group-common RNTI to schedule group-common PDSCH which is scrambled with the same group-common RNTI. The "PTM transmission scheme 1" is also called "group-common PDCCH based group scheduling scheme". As another example, for RRC-CONNECTED UEs in the same MBS group, the "PTM transmission scheme 2" uses UE-specific PDCCH with CRC scrambled by UE-specific RNTI (e.g., C-RNTI) to schedule group-common PDSCH which is scrambled with the same group-common RNTI. The "PTM transmission scheme 2" is also called "UE-specific PDCCH based group scheduling scheme". As another example, for RRC-CONNECTED UEs, the "PTP transmission" uses UE-specific PDCCH with CRC scrambled by UE-specific RNTI (e.g., C-RNTI) to schedule UE-specific PDSCH which is scrambled with the same UE-specific RNTI.

Until now, the current NR MAC specification, e.g., TS 38.321 V16.3.0, considers only the C-RNTI and/or CS-RNTI as the condition of maintaining the "bwp-Inactivity-Timer", which is used for controlling BWP switching. It is known that C-RNTI and/or CS-RNTI is used for unicast transmission and unicast is also used as PTP transmission for MBS service. However, if the UE receives the MBS service through other transmission scheme (e.g., PTM transmission scheme1), the new group-common RNTI (e.g., GC-RNTI) is used instead of C-RNTI and/or CS-RNTI. In this case, the UE may not start or restart the "bwp-InactivityTimer" and the "bwp-InactivityTimer" may expire and causes the UE to perform BWP switching to a BWP indicated by the default-DownlinkBWP-Id if the defaultDownlinkBWP-Id is configured, or switching to the initialDownlinkBWP if the default-DownlinkBWP-Id is not configured. The unintended BWP switching behaviour may cause the UE to fail to receive the downlink transmission on the BWP before the unintended switching for a period of time.

In order to solve the issue of the "unintended BWP switching" described above, one or more of the following concepts, mechanisms, methods, and/or embodiments are provided or implemented. For example, by applying one or more of these proposed methods, unintended BWP switching is avoided and the risk of packet loss due to the unintended BWP switching is reduced.

Figure 13:
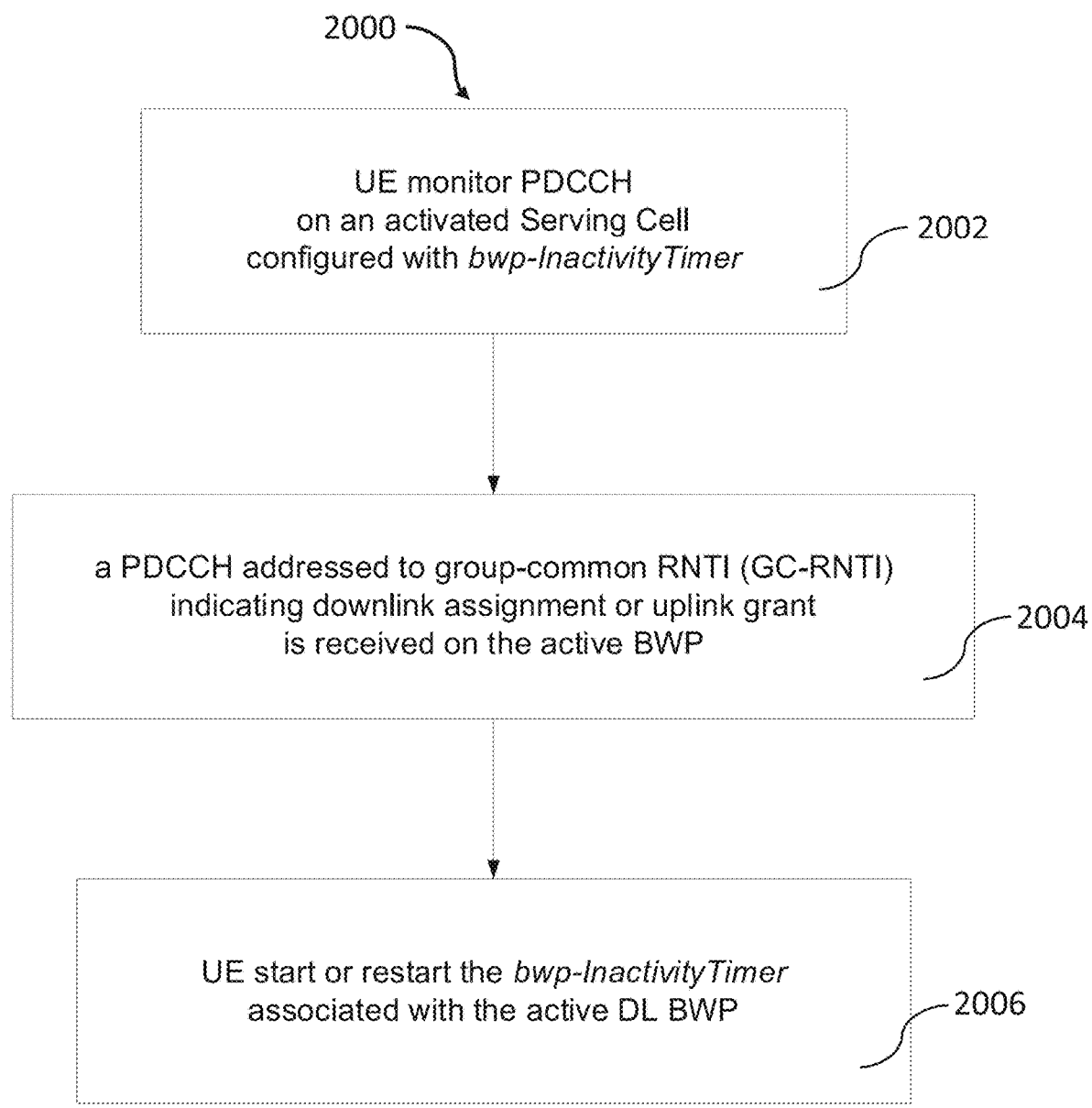
FIG. 13 is a flow diagram showing a method for avoiding unintended BWP switching, with the UE monitoring PDCCH on an activated Serving Cell configured with bwp-InactivityTimer, with the PDCCH addressed to GC-RNTI indicating downlink assignment or uplink grant is received on the active BWP, and starting or restarting the timer associated with active DL BWP, in accordance with embodiments of the present invention.

Referring to the exemplary embodiment of FIG. 13, a method of the present invention is that in addition to the C-RNTI and/or CS-RNTI, the new group-common RNTI (e.g., GC-RNTI) is considered as the condition of maintaining the "bwp-InactivityTimer", which is used for controlling BWP switching. Preferably, a PDCCH addressed to the new group-common RNTI (e.g., GC-RNTI) indicating downlink assignment or uplink grant is received on the active BWP and is considered as the condition to start or restart the bwp-InactivityTimer associated with the active DL BWP.

Embodiments can include a device (e.g., UE) configured with at least an activated serving cell, wherein the activated serving cell is configured with one or multiple BWPs. The device monitors PDCCH on an active BWP, wherein the active BWP is one of the configured BWP, and the active BWP includes an active DL BWP, and wherein the active DL BWP is associated with a timer. The device receives an information from PDCCH, wherein the reception from PDCCH is addressed to a group-common RNTI (GC-RNTI), and the information indicates downlink assignment or uplink grant on the active BWP. The device starts or restarts the timer associated with the active DL BWP.

For the example process 2000 of FIG. 13, the device is a UE that monitors PDCCH on an activated Serving Cell configured with a bwp-InactivityTimer at step 2002, a PDCCH addressed to GC-RNTI indicating a downlink assignment or an uplink grant is received on the active BWP at step 2004, and the UE starts or restarts the bwp-InactivityTimer associated with the active DL BWP at step 2006.

In various embodiments, the device is a UE.

In various embodiments, the timer is a bwp-Inactivity-Timer, wherein the bwp-InactivityTimer triggers the behavior of BWP switching if the bwp-InactivityTimer expires.

In various embodiments, if the bwp-InactivityTimer expires, the device performs BWP switching to another BWP indicated by defaultDownlinkBWP-Id, wherein the BWP indicated by defaultDownlinkBWP-Id is one of the configured BWP.

In various embodiments, if the bwp-InactivityTimer expires, the device performs BWP switching to the BWP indicated by initialDownlinkBWP, wherein the BWP indicated by initialDownlinkBWP is one of the configured BWP.

In various embodiments, the active BWP includes an active DL BWP and an active UL BWP.

In various embodiments, the active DL BWP and the active UL BWP of the active BWP are paired.

Referring back to FIGS. 3 and 4, in one or more embodiments, the device 300 includes program code 312 stored in memory 310. The CPU 308 could execute program code 312 to (i) configure the device 300 with at least an activated serving cell, wherein the activated serving cell is configured with one or multiple BWPs, (ii) monitor PDCCH on an active BWP, wherein the active BWP is one of the configured BWP, and the active BWP includes an active DL BWP, wherein the active DL BWP is associated with a timer, (iii) receive an information from PDCCH, wherein the reception from PDCCH is addressed to a GC-RNTI, and the information indicates downlink assignment or uplink grant on the active BWP, and (iv) start or restart the timer associated with the active DL BWP. Moreover, the CPU 308 can execute the program code 312 to perform all of the described actions, steps, and methods described herein.

Another method of the present invention is that the value "infinity" can be applied to the value of the bwp-InactivityTimer. Preferably, the value "infinity" is applied to the value of the bwp-InactivityTimer associated with the active DL BWP during the process steps of the UE initiating the MBS service. Preferably, the original value of the bwp-InactivityTimer associated with the active DL BWP is recovered during the process steps of the UE closing the MBS service.

Another method of the present invention is that the configuration of the bwp-InactivityTimer is removed when the UE joins the MBS service. Preferably, the status of the bwp-InactivityTimer associated with the active DL BWP of the serving cell is changed to be "not configured" during the process steps of the UE initiating the MBS service. Preferably, the status of the bwp-InactivityTimer associated with the active DL BWP of the serving cell is recovered during the process steps of the UE closing the MBS service.

It is noted that any of the methods, alternatives, steps, examples, and embodiments proposed herein may be applied independently, individually, and/or with multiple methods, alternatives, steps, examples, and embodiments combined together.

Various aspects of the disclosure have been described above. It should be apparent that the teachings herein may be embodied in a wide variety of forms and that any specific structure, function, or both being disclosed herein is merely representative. Based on the teachings herein one skilled in the art should appreciate that an aspect disclosed herein may be implemented independently of any other aspects and that two or more of these aspects may be combined in various ways. For example, an apparatus may be implemented or a method may be practiced using any number of the aspects set forth herein. In addition, such an apparatus may be implemented or such a method may be practiced using other structure, functionality, or structure and functionality in addition to or other than one or more of the aspects set forth herein. As an example of some of the above concepts, in some aspects, concurrent channels may be established based on pulse repetition frequencies. In some aspects, concurrent channels may be established based on pulse position or offsets. In some aspects, concurrent channels may be established based on time hopping sequences. In some aspects, concurrent channels may be established based on pulse repetition frequencies, pulse positions or offsets, and time hopping sequences.

Those of ordinary skill in the art would understand that information and signals may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

Those of ordinary skill in the art would further appreciate that the various illustrative logical blocks, modules, processors, means, circuits, and algorithm steps described in connection with the aspects disclosed herein may be implemented as electronic hardware (e.g., a digital implementation, an analog implementation, or a combination of the two, which may be designed using source coding or some other technique), various forms of program or design code incorporating instructions (which may be referred to herein, for convenience, as "software" or a "software module"), or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present disclosure.

In addition, the various illustrative logical blocks, modules, and circuits described in connection with the aspects disclosed herein may be implemented within or performed by an integrated circuit ("IC"), an access terminal, or an access point. The IC may comprise a general purpose processor, a digital signal processor (DSP), an application specific integrated circuit (ASIC), a field programmable gate array (FPGA) or other programmable logic device, discrete gate or transistor logic, discrete hardware components, electrical components, optical components, mechanical components, or any combination thereof designed to perform the functions described herein, and may execute codes or instructions that reside within the IC, outside of the IC, or both. A general purpose processor may be a microprocessor, but in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

It is understood that any specific order or hierarchy of steps in any disclosed process is an example of a sample approach. Based upon design preferences, it is understood that the specific order or hierarchy of steps in the processes may be rearranged while remaining within the scope of the present disclosure. The accompanying method claims present elements of the various steps in a sample order, and are not meant to be limited to the specific order or hierarchy presented.

The steps of a method or algorithm described in connection with the aspects disclosed herein may be embodied directly in hardware, in a software module executed by a processor, or in a combination of the two. A software module (e.g., including executable instructions and related data) and other data may reside in a data memory such as RAM memory, flash memory, ROM memory, EPROM memory, EEPROM memory, registers, a hard disk, a removable disk, a CD-ROM, or any other form of computer-readable storage medium known in the art. A sample storage medium may be coupled to a machine such as, for example, a computer/processor (which may be referred to herein, for convenience, as a "processor") such the processor can read information (e.g., code) from and write information to the storage medium. A sample storage medium may be integral to the processor. The processor and the storage medium may reside in an ASIC. The ASIC may reside in user equipment. In the alternative, the processor and the storage medium may reside as discrete components in user equipment. Moreover, in some aspects, any suitable computer-program product may comprise a computer-readable medium comprising codes relating to one or more of the aspects of the disclosure. In some aspects, a computer program product may comprise packaging materials.

While the invention has been described in connection with various aspects and examples, it will be understood that the invention is capable of further modifications. This application is intended to cover any variations, uses or adaptation of the invention following, in general, the principles of the invention, and including such departures from the present disclosure as come within the known and customary practice within the art to which the invention pertains.

What is claimed is:

1. A method for a device, comprising:
configuring the device, by a network node, through a signaling with a functionality, wherein the functionality is associated with a timer;
receiving a package, wherein the package contains one or more payload, and the one or more payload is mapped to a logical channel, wherein the logical channel is a Multicast/Broadcast Services (MBS) Traffic Channel (MTCH) used for multicast service; and
starting or restarting the timer, wherein the timer is a data-InactivityTimer, and wherein when the data-InactivityTimer expires, the device performs Radio Resource Control (RRC) state transition to RRC_IDLE state.

2. The method of claim 1, wherein the device is a User Equipment (UE).

3. The method of claim 1, wherein the network node is a gNB.

4. The method of claim 1, wherein the signaling is a RRC message.

5. The method of claim 1, wherein the functionality is about data inactivity monitoring and operation.

6. The method of claim 1, wherein the package is a medium access control (MAC) protocol data unit (PDU).

7. The method of claim 1, wherein the payload is a MAC service data unit (SDU).

8. A device, comprising:
a memory; and
a processor operatively coupled to the memory, wherein the processor is configured to execute program code to:
configure the device, by a network node, through a signaling with a functionality, wherein the functionality is associated with a timer;
receive a package, wherein the package contains one or more payload, and the one or more payload is mapped to a logical channel, wherein the logical channel is a Multicast/Broadcast Services (MBS) Traffic Channel (MTCH) used for multicast and/or broadcast service; and
start or restart the timer, wherein the timer is a data-InactivityTimer, and wherein when the data-InactivityTimer expires, the device performs Radio Resource Control (RRC) state transition to RRC_IDLE state.

9. The device of claim 8, wherein the device is a User Equipment (UE).

10. The device of claim 8, wherein the network node is a gNB.

11. The device of claim 8, wherein the signaling is a RRC message.

12. The device of claim 8, wherein the functionality is about data inactivity monitoring and operation.

13. The device of claim 8, wherein the package is a medium access control (MAC) protocol data unit (PDU).

14. The device of claim 8, wherein the payload is a MAC service data unit (SDU).

* * * * *